United States Patent
Han et al.

(10) Patent No.: US 9,082,366 B2
(45) Date of Patent: Jul. 14, 2015

(54) POWER CONVERTING CIRCUIT OF A DISPLAY DRIVER

(75) Inventors: Byung-Hun Han, Seoul (KR);
Kyung-Hoon Chung, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 318 days.

(21) Appl. No.: 13/563,295

(22) Filed: Jul. 31, 2012

(65) Prior Publication Data

US 2013/0057530 A1 Mar. 7, 2013

(30) Foreign Application Priority Data

Sep. 1, 2011 (KR) .......................... 10-2011-0088357

(51) Int. Cl.
| | |
|---|---|
| G09G 5/00 | (2006.01) |
| G09G 3/36 | (2006.01) |
| H02M 3/07 | (2006.01) |
| H02M 3/155 | (2006.01) |

(52) U.S. Cl.
CPC ........ *G09G 3/3696* (2013.01); *G09G 2330/021* (2013.01); *G09G 2330/026* (2013.01); *G09G 2330/028* (2013.01); *H02M 3/07* (2013.01); *H02M 3/155* (2013.01)

(58) Field of Classification Search
CPC .......... G09G 3/3696; G09G 2330/02–2330/12
See application file for complete search history.

(56) References Cited

U.S. PATENT DOCUMENTS

| | | | |
|---|---|---|---|
| 6,633,287 B1 | 10/2003 | Yatabe et al. | |
| 2004/0125065 A1* | 7/2004 | Park et al. | 345/92 |
| 2009/0021505 A1 | 1/2009 | Kang et al. | |
| 2010/0245327 A1* | 9/2010 | Tsujino et al. | 345/211 |
| 2012/0062205 A1* | 3/2012 | Levesque et al. | 323/318 |

FOREIGN PATENT DOCUMENTS

| | | |
|---|---|---|
| JP | 2001-051662 | 2/2001 |
| KR | 1020070043451 A | 4/2007 |
| KR | 1020090001162 A | 1/2009 |

* cited by examiner

*Primary Examiner* — Yong H Sim
(74) *Attorney, Agent, or Firm* — F. Chau & Associates, LLC

(57) ABSTRACT

A power converting circuit of a display driver includes a positive voltage generator and a negative voltage generator. The positive voltage generator includes a first capacitive DC-DC converter and a first inductive DC-DC converter, and generates a positive source voltage by selectively using one of the first capacitive DC-DC converter, the first inductive DC-DC converter, or a first external power supply voltage. The negative voltage generator includes a second capacitive DC-DC converter and a second inductive DC-DC converter, and generates a negative source voltage by selectively using one of the second capacitive DC-DC converter, the second inductive DC-DC converter, or a second external power supply voltage.

7 Claims, 24 Drawing Sheets

POWER CONVERTING CIRCUIT OF A DISPLAY DRIVER

CROSS-REFERENCE TO RELATED APPLICATIONS

This U.S. non-provisional application claims priority under 35 U.S.C. §119 to Korean Patent Application No. 2011-0088357 filed on Sep. 1, 2011 in the Korean Intellectual Property Office (KIPO), the entire content of which is incorporated by reference herein in its entirety.

TECHNICAL FIELD

Exemplary embodiments relate to power converting circuits, and more particularly to power converting circuits for supplying power to display devices.

DISCUSSION OF THE RELATED ART

Display driver integrated circuits (DDIs) are integrated circuit (IC)s that control display panels. A DDI may apply a driving signal and a data signal to a display panel to display an image. The DDI may include a source driver, a gate driver and a timing controller. A mobile DDI employed in a mobile display device may be implemented as a single chip where the source driver, the gate driver and the timing controller are integrated. The source driver may provide target pixels included in the display panel with a data signal corresponding to an image to display an image on the display panel. The source driver may generate a data signal by receiving a positive source voltage and a negative source voltage from a power converting circuit.

Since the source voltages may be higher than a voltage supplied from an external device to a display device, a direct current-direct current (DC-DC) converter may be used as the power converting circuit to generate the source voltages higher than the supplied voltage. A capacitive DC-DC converter is used as the power converting circuit in a conventional display device. However, as the size, the resolution and performance of the display panel increase, the source driver may have an increased current load. Thus, an inductive DC-DC converter may be used instead of the capacitive DC-DC converter or alternatively the source voltage may be directly supplied from the external device to the panel.

SUMMARY

Exemplary embodiments provide a power converting circuit of a display device that selectively uses a capacitive DC-DC converter, an inductive DC-DC converter or an external power supply voltage to generate a source voltage.

In an exemplary embodiment, a power converting circuit of a display driver includes a positive voltage generator and a negative voltage generator. The positive voltage generator includes a first capacitive DC-DC converter and a first inductive DC-DC converter, and generates a positive source voltage by selectively using one of the first capacitive DC-DC converter, the first inductive DC-DC converter, or a first external power supply voltage. The negative voltage generator includes a second capacitive DC-DC converter and a second inductive DC-DC converter, and generates a negative source voltage by selectively using one of the second capacitive DC-DC converter, the second inductive DC-DC converter, or a second external power supply voltage.

In an exemplary embodiments, the positive voltage generator may be configured to use the first capacitive DC-DC converter, the first inductive DC-DC converter, and the first external power supply voltage in an order of the first capacitive DC-DC converter, the first inductive DC-DC converter, and the first external power supply voltage as an amount of a source current supplied from a source driver to a display panel increases, and the negative voltage generator may be configured to use the second capacitive DC-DC converter, the second inductive DC-DC converter, and the second external power supply voltage in an order of the second capacitive DC-DC converter, the second inductive DC-DC converter, and the second external power supply voltage as the amount of the source current increases.

In an exemplary embodiment, the positive and negative voltage generators may be configured to generate the positive and negative source voltages by using the first and second capacitive DC-DC converters when the amount of the source current is lower than a first predetermined value, may be configured to generate the positive and negative source voltages by using one of the first or second capacitive DC-DC converter and one of the first or second inductive DC-DC converter when the amount of the source current is higher than or equal to the first predetermined value and is lower than a second predetermined value, may be configured to generate the positive and negative source voltages by using the first and second inductive DC-DC converters when the amount of the source current is higher than or equal to the second predetermined value and is lower than a third predetermined value, may be configured to generate the positive and negative source voltages by using one of the first or second inductive DC-DC converter and one of the first or second external power supply voltage when the amount of the source current is higher than or equal to the third predetermined value and is lower than a fourth predetermined value, and may be configured to generate the positive and negative source voltages by using the first and second external power supply voltages when the amount of the source current is higher than the fourth predetermined value.

In an exemplary embodiment, the first capacitive DC-DC converter may include a first capacitive control circuit and a first capacitive converting circuit including at least one capacitor, the first inductive DC-DC converter may include a first inductive control circuit and a first inductive converting circuit including at least one inductor, the second capacitive DC-DC converter may include a second capacitive control circuit and a second capacitive converting circuit including at least one capacitor, and the second inductive DC-DC converter may include a second inductive control circuit and a second inductive converting circuit including at least one inductor.

In an exemplary embodiment, the first capacitive control circuit, the first inductive control circuit, the second capacitive control circuit and the second inductive control circuit may be located in the display driver, and the first capacitive converting circuit, the first inductive converting circuit, the second capacitive converting circuit and the second inductive converting circuit may be located in a flexible printed circuit (FPC) that connects the display driver with a main board.

In an exemplary embodiment, at least one of the first or second capacitive converting circuit may include a charge pump, the first inductive converting circuit may include a boost converter, and the second inductive converting circuit may include a buck-boost converter.

In an exemplary embodiment, the first inductive control circuit and the second inductive control circuit may be implemented as one inductive control circuit that is configured to control both of the first and second inductive converting circuits.

In an exemplary embodiment, the first and second inductive converting circuits may share one inductor.

According to an exemplary embodiment, a power converting circuit of a display driver includes a converter selecting unit, a positive voltage generator and a negative voltage generator. The converter selecting unit generates a selection signal representing a type of a converter. The positive voltage generator includes a first capacitive DC-DC converter and a first inductive DC-DC converter, generates a positive source voltage by selectively using one of the first capacitive DC-DC converter, the first inductive DC-DC converter, or a first external power supply voltage in response to the selection signal. The negative voltage generator includes a second capacitive DC-DC converter and a second inductive DC-DC converter, and generates a negative source voltage by selectively using one of the second capacitive DC-DC converter, the second inductive DC-DC converter, or a second external power supply voltage in response to the selection signal.

In an exemplary embodiment, the converter selecting unit may be configured to generate the selection signal by detecting an amount of a source current supplied to a display panel.

In an exemplary embodiment, the converter selecting unit may include a current detector configured to detect an amount of the source current supplied to the display panel, and a selection signal generator configured to generate the selection signal based on the amount of the source current detected by the current detector.

In an exemplary embodiment, the converter selecting unit may be configured to receive information about at least one of an operation mode, a brightness, or a resolution of a display device from an external controller and may be configured to generate the selection signal based on the information received from the external controller.

In an exemplary embodiment, the converter selecting unit may include a register configured to store the information received from the external controller, and a selection signal generator configured to generate the selection signal based on the information stored in the register.

In an exemplary embodiment, the positive voltage generator may be configured to use the first capacitive DC-DC converter, the first inductive DC-DC converter, and the first external power supply voltage in an order of the first capacitive DC-DC converter, the first inductive DC-DC converter, and the first external power supply voltage as a resolution of a display device increases, and the negative voltage generator may be configured to use the second capacitive DC-DC converter, the second inductive DC-DC converter, and the second external power supply voltage in an order of the second capacitive DC-DC converter, the second inductive DC-DC converter, and the second external power supply voltage as the resolution of the display device increases.

In an exemplary embodiment, the positive voltage generator may be configured to use the first capacitive DC-DC converter, the first inductive DC-DC converter, and the first external power supply voltage in an order of the first capacitive DC-DC converter, the first inductive DC-DC converter, and the first external power supply voltage as a brightness of a display device increases, and the negative voltage generator may be configured to use the second capacitive DC-DC converter, the second inductive DC-DC converter, and the second external power supply voltage in an order of the second capacitive DC-DC converter, the second inductive DC-DC converter, and the second external power supply voltage as the brightness of the display device increases.

According to an embodiment, there is provided a method of operating a display device including a display panel and a power converting circuit, the method including changing a selection signal in response to a change in a current flowing through the display panel, selecting at least one of at least one conductive converter, at least one inductive converter, or an external voltage source in response to the changed selection signal, wherein the conductive converter and the inductive converter are included in the power converting circuit, generating a source voltage by the selected converter or the external voltage source, and supplying a source current corresponding to the source voltage to the display panel.

In an embodiment, the source voltage includes a positive source voltage and a negative source voltage, and wherein the negative source voltage is generated a predetermined time interval after the positive source voltage is generated.

In an embodiment, when two of the at least one conductive converter are selected, the selected two conductive converters generate the positive source voltage and the negative source voltage, respectively.

In an embodiment, when one of the at least one conductive converter and one of the at least one inductive converter are selected, the selected inductive converter generates the positive source voltage, and the selected conductive converter generates the negative source voltage.

In an embodiment, when the external voltage source and one of the at least one conductive converter are selected, the external voltage source generates the positive source voltage, and the selected conductive converter generates the negative source voltage.

BRIEF DESCRIPTION OF THE DRAWINGS

Illustrative, non-limiting exemplary embodiments will be more clearly understood from the following detailed description taken in conjunction with the accompanying drawings.

DETAILED DESCRIPTION OF THE EMBODIMENTS

Figure 1:
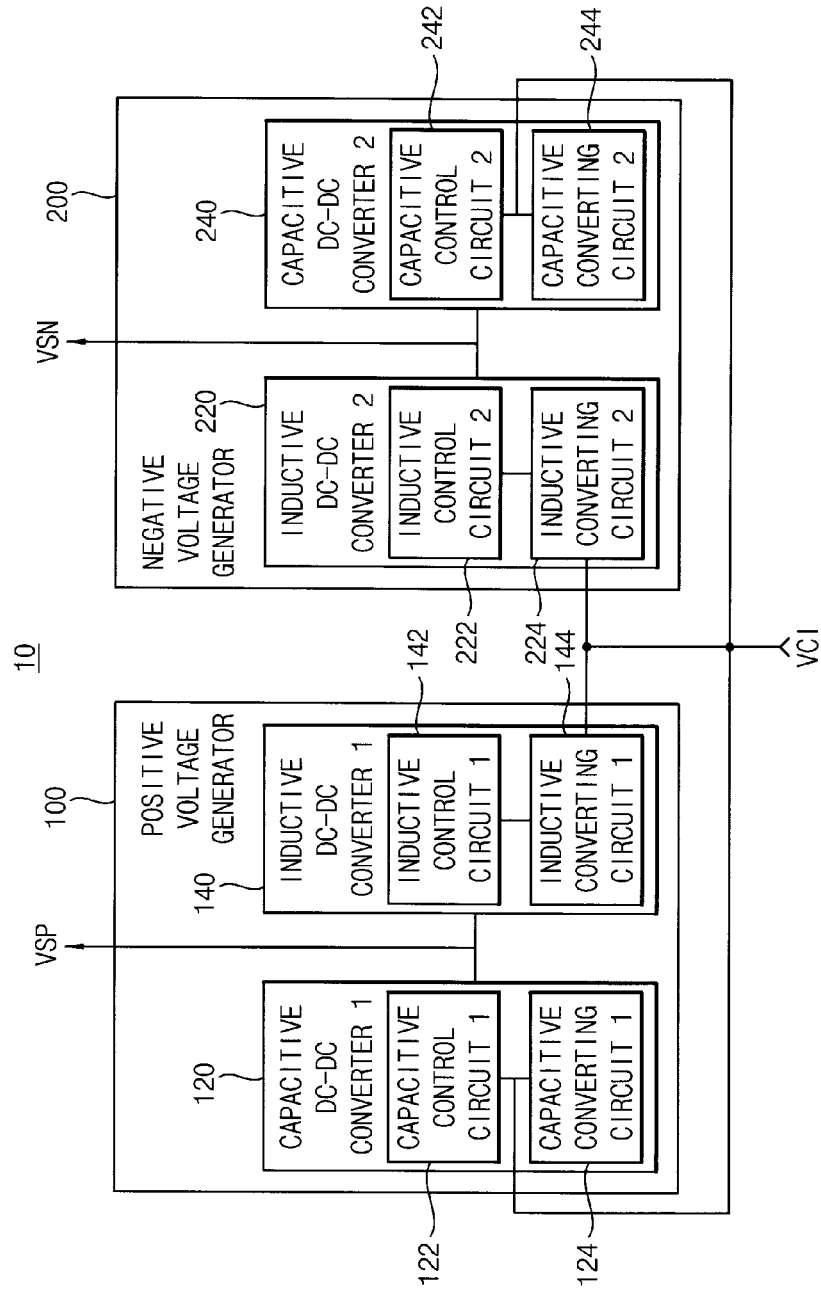
FIG. 1 is a block diagram illustrating a power converting circuit of a display driver according to an exemplary embodiment.

Various exemplary embodiments will be described more fully hereinafter with reference to the accompanying drawings. The present inventive concept may, however, be embodied in many different forms and should not be construed as limited to the exemplary embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. Like numerals may refer to like or similar elements throughout the specification and the drawings. As used herein, the term "and/or" may include any and all combinations of one or more of the associated listed items.

As used herein, the singular forms "a," "an" and "the" are intended to include the plural forms as well, unless the context clearly indicates otherwise.

As will be appreciated by one skilled in the art, embodiments of the present invention may be embodied as a system, method, computer program product, or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

As will be appreciated by one skilled in the art, embodiments of the present invention may be embodied as a system, method, computer program product, or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

FIG. 1 is a block diagram illustrating a power converting circuit of a display driver according to an exemplary embodiment.

Referring to FIG. 1, a power converting circuit 10 of a display driver includes a positive voltage generator 100 and a negative voltage generator 200. The positive voltage generator 100 includes a first capacitive DC-DC converter 120 and a first inductive DC-DC converter 140, and the negative voltage generator 200 includes a second capacitive DC-DC converter 240 and a second inductive DC-DC converter 220. The first capacitive DC-DC converter 120 includes a first capacitive control circuit 122 and a first capacitive converting circuit 124, the first inductive DC-DC converter 140 includes a first inductive control circuit 142 and a first inductive converting circuit 144, the second capacitive DC-DC converter 240 includes a second capacitive control circuit 242 and a second capacitive converting circuit 244, and the second inductive DC-DC converter 220 includes a second inductive control circuit 222 and a second inductive converting circuit 224.

Figure 3:
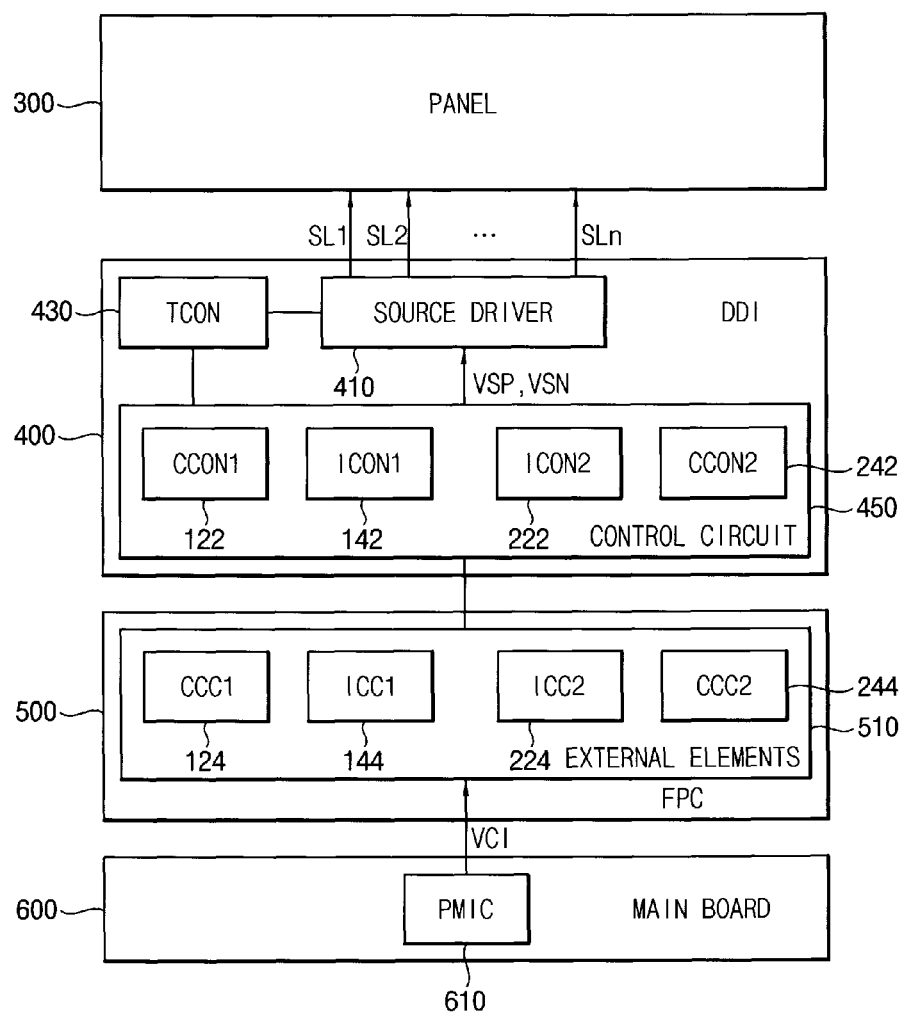
FIG. 3 is a block diagram of a display device for describing a location of a power converting circuit of a display driver according to an exemplary embodiment.

In an exemplary embodiment, the positive voltage generator 100 and the negative voltage generator 200 receive an input voltage VCI from a power management integrated circuit (PMIC) 610 as illustrated in FIG. 3 and generate a positive source voltage VSP and a negative source voltage VSN by converting the input voltage VCI. For example, the positive voltage generator 100 generates the positive source voltage VSP by stepping up the input voltage VCI using at least one of the first capacitive DC-DC converter 120 and the first inductive DC-DC converter 140, and the negative voltage generator 200 generates the negative source voltage VSN by inverting or stepping down the input voltage VCI using at least one of the second capacitive DC-DC converter 240 and the second inductive DC-DC converter 220. For example, in a case of a mobile display device, the input voltage VCI ranges from about 2.6 V to about 3.3 V, and the positive source voltage VSP and the negative source voltage VSN are about +5.5 V and −5.5 V, respectively.

According to an exemplary embodiment, the positive voltage generator 100 generates the positive source voltage VSP by selectively using the first capacitive DC-DC converter 120, the first inductive DC-DC converter 140 or a first external power supply voltage received from an external device, and the negative voltage generator 200 generates the negative source voltage VSN by selectively using the second capacitive DC-DC converter 240, the second inductive DC-DC converter 220 or a second external power supply voltage received from the external device. A display driver integrated circuit (DDI) according to an exemplary embodiment, e.g., when manufactured, includes the capacitive DC-DC converters 120 and 240 and the inductive DC-DC converters 140 and 220, and thereafter the type of a converter to be used is determined based on the amount of a source current for driving a display panel. For example, in a case where a source current of about 20 mA is used in the display panel, the power converting circuit 10 operates a specific type of a convert that allows the power converting circuit 10 to produce the source current of about 20 mA. For example, to supply the source current of about 20 mA to the display panel, the power converting circuit 10 uses the first inductive DC-DC converter 140 to generate the positive source voltage VSP from the input voltage VCI and uses the second capacitive DC-DC converter 240 to generate the negative source voltage VSN from the input voltage VCI. The types of the converters according to the amount of a source current will be described below with reference to FIGS. 4 through 13.

Since the power converting circuit 10 selectively uses different types of converters depending on the amount of a source current to be supplied to the display panel, a display device including the power converting circuit 10 may stably supply power to the display panel. The power converting circuit 10, when manufactured, includes the capacitive DC-DC converters and the inductive DC-DC converters, and thus the DDI including the power converting circuit 10 may be readily applied to any display device.

Figure 2:
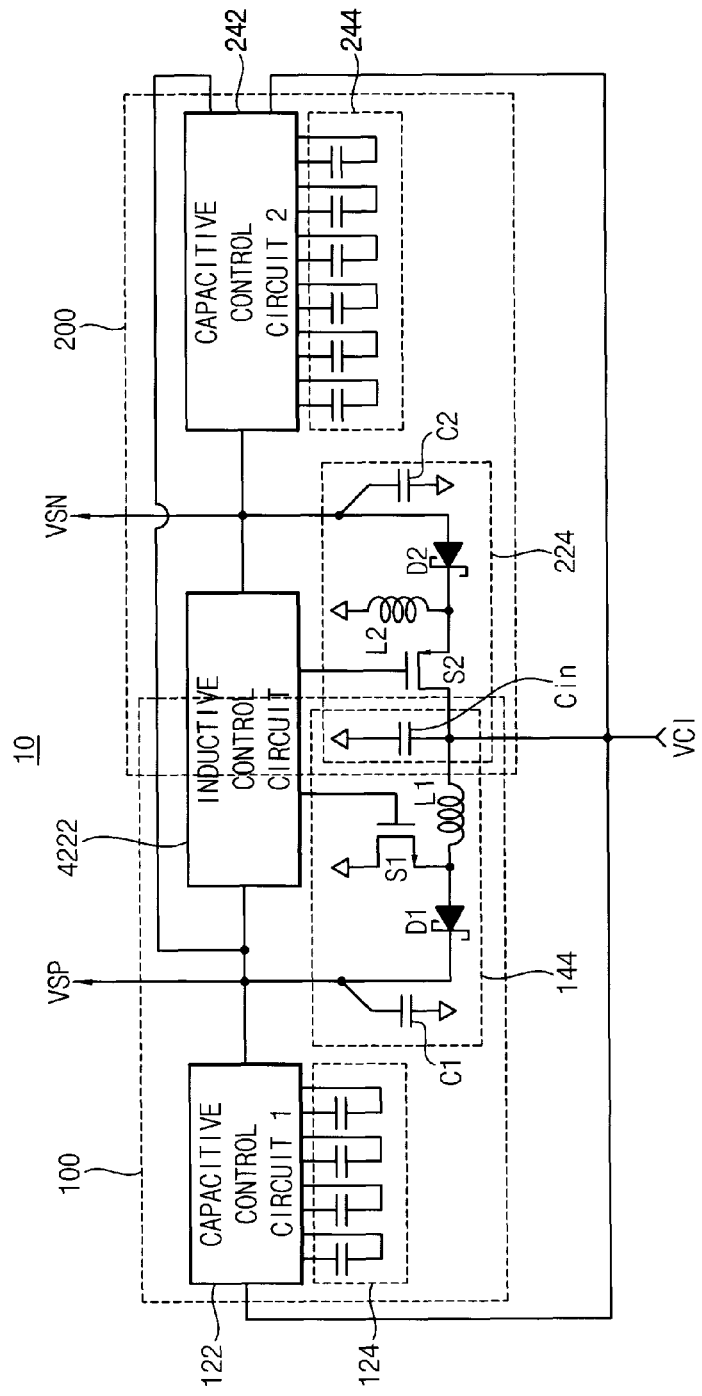
FIG. 2 is a circuit diagram illustrating a power converting circuit of a display driver according to an exemplary embodiment.

FIG. 2 is a circuit diagram illustrating a power converting circuit of a display driver according to an exemplary embodiment. FIG. 2 illustrates an example of a configuration of the power converting circuit 10 of FIG. 1.

Referring to FIG. 2, the first capacitive converting circuit 124 includes a charge pump having a plurality of capacitors, and the first inductive converting circuit 144 includes a boost converter. The second capacitive converting circuit 244 includes a charge pump having a plurality of capacitors, and the second inductive converting circuit 224 includes a buck-boost converter. Hereinafter, an operation of the charge pump included in the first capacitive converting circuit 124 or the second capacitive converting circuit 244 will be described below.

The charge pump includes a plurality of capacitors and a plurality of switches. The switches are selectively turned on or off to connect the capacitors, and a voltage is stepped up or down by the connected capacitors. The stepped up or down voltage is output via a transfer switch. The charge pump generates various output voltages, for example, 1.5 times, 2 times, 3 times or −1 times an input voltage according to an arrangement or connections of the capacitors and the switches. Each switch transfers a voltage from an end of the switch to another end of the switch in response to a switching signal. A plurality of switching signals respectively provided to the plurality of switches have different phases from one another.

As illustrated in FIG. 2, each of the first and second capacitive converting circuits 124 and 244 includes a plurality of capacitors. In an exemplary embodiment, the number (or size) of capacitors included in the first capacitive converting circuit 124 is smaller than the number (or size) of capacitors included in the second capacitive converting circuit 244. For example, the first capacitive converting circuit 124 uses a relatively small number of capacitors to step up an input voltage VCI of about 2.6 V to a positive source voltage VSP of about 5.5 V, and the second capacitive converting circuit 244 uses a relatively large number of capacitors to step down the input voltage VCI of about 2.6 V to a negative source voltage VSN of about −5.5 V. Each of the first and second capacitive converting circuits 124 and 244 further includes a plurality of switches and a timing controller. The plurality of switches and the timing controller control the first and second capacitive converting circuits 124 and 244 to perform a charge pumping operation.

As illustrated in FIG. 2, the first inductive converting circuit 144 includes a boost converter, and the second inductive converting circuit 224 includes a buck-boost converter. According to an embodiment, the boost converter is used to boost a voltage, and the buck-boost converter is used to invert a voltage. The boost converter 144 includes a first inductor L1, a first capacitor C1, a first diode D1 and a first switch S1. The boost converter 144 receives the input voltage VCI, steps up the input voltage VCI via the first inductor L1 and the first diode D1 that are connected in series, and stores the stepped up voltage in the first capacitor C1. The buck-boost converter 224 includes a second inductor L2, a second capacitor C2, a second diode D2 and a second switch S2. The buck-boost converter 224 receives the input voltage VCI, inverts and/or steps down the input voltage VCI via the second inductor L2 and the second diode D2 that are connected in parallel, and stores the stepped down voltage in the second capacitor C2. In an exemplary embodiment, the boost converter 144 and the buck-boost converter 224 share an input capacitor CM coupled to a node where the input voltage VCI is supplied. The input capacitor CM is used to stabilize the input voltage VCI. In an exemplary embodiment, the first and second switches S1 and S2 are implemented as field effect transistors, and the first and second diodes D1 and D2 include Zener diodes.

In an exemplary embodiment, as illustrated in FIG. 2, a first inductive control circuit 142 and a second inductive control circuit 222 as illustrated in FIG. 1 are implemented as one inductive control circuit 4222 that is shared by the first and second inductive converting circuits 144 and 224. As will be described below with reference to FIG. 10, according to an embodiment, one inductive control circuit 4222 is used for a configuration where the first and second inductive converting circuits 144 and 224 share one inductor. The inductive control circuit 4222 includes a timing controller for controlling the first and second inductive converting circuits 144 and 224. For example, the inductive control circuit 4222 uses the timing controller to generate switching signals applied to the first and second switches S1 and S2 included in the first and second inductive converting circuits 144 and 224. In an exemplary embodiment, as illustrated in FIG. 1, the inductive control circuit 4222 is implemented with two control circuits 142 and 222 respectively controlling the first and second inductive converting circuits 144 and 224.

FIG. 3 is a block diagram of a display device for describing a location of a power converting circuit of a display driver according to an exemplary embodiment.

In FIG. 3, an example of an arrangement of components included in a display device (e.g., a mobile display device) is illustrated. Referring to FIG. 3, a display driver integrated circuit (DDI) 400 includes a source driver 410, a timing controller 430 and a control circuit 450. The source driver 410 provides source currents SL1, SL2 and SLn to the display panel 300. The timing controller 430 controls operation timings of the source driver 410 and the control circuit 450. A flexible display panel (FPC) 500 connects the DDI 400 to a main board 600. The main board 600 includes a power management integrated circuit (PMIC) 610 providing the input voltage VCI to external elements 510.

The control circuit 450 includes the first capacitive control circuit 122, the first inductive control circuit 142, the second inductive control circuit 222 and the second capacitive control circuit 242 that are located in the DDI 400. The external elements 510 include the first capacitive converting circuit 124, the first inductive converting circuit 144, the second inductive converting circuit 224 and the second capacitive converting circuit 244 that are located in the FPC 500. The control circuit 450 is disposed in the DDI 400, and the external elements 510 are disposed in the FPC 500.

When passive elements including capacitors and/or inductors are disposed in a display driver integrated circuit, the voltage conversion efficiency of the passive elements may be reduced due to a resistance of indium tin oxide (ITO). In an exemplary embodiment, the control circuit 450 and the external elements 510 are disposed in the DDI 400 and the FPC 500, respectively, and thus the voltage conversion efficiency may be increased. Since passive elements having a large size, for example inductors, are disposed outside the DDI 400, space efficiency may be increased. In an exemplary embodiment, the DDI 400 including the control circuit 450 that is able to control both of a capacitive DC-DC converter and an inductive DC-DC converter is mass-produced, and passive elements may be formed on the FPC 500 according to the type of a display panel and/or a source current load when a display device including the DDI 400 is manufactured. As a result, a source current may be stably supplied to the display panel, and productivity and compatibility of the DDI 400 may be increased.

Hereinafter, various forms of power converting circuits according to the amount of a source current will be described below with reference to FIGS. 4 through 13.

As the resolution and the size of a display panel (e.g., a mobile display panel) increase, a current load supplied from a source driver to a display panel may increase. Thus, in some cases, the source driver continuously supplies a high current to the display panel. Accordingly, a power converting circuit for stably supplying a source current to the display panel may be provide. Compared to a capacitive DC-DC converter, an inductive DC-DC converter supplies a relatively high current to the display panel at the same output voltage. However, the inductive DC-DC converter has relatively low space efficiency due to its large size. In a case where a display panel requires a current higher than the current capacity of the inductive DC-DC converter, a source current may be directly supplied from an external device to the display panel. In Table 1, examples of various power converting circuits according to a source current and details thereof are shown.

TABLE 1

| | VCI | VSP | VSN | Configuration | Details |
|---|---|---|---|---|---|
| Example 1 | 2.6~3.3 V | +5.5 V (charge pump) | −5.5 V (charge pump) | Two capacitive converters | supply a source current up to 10 mA Small size and low cost Performance depends on a parasitic resistance |
| Example 2 | 2.6~3.3 V | +5.5 V (SMPS) | −5.5 V (charge pump) | One inductive converter (one inductor) and One capacitive converter | supply a source current up to 20 mA Practical power/voltage efficiency Large size and considerable cost |
| Example 3 | 2.6~3.3 V | +5.5 V (SMPS) | −5.5 V (charge pump + VSP) | One inductive converter (one inductor) and One capacitive converter | supply a source current up to 30 mA Practical power/voltage efficiency Large size and considerable cost |
| Example 4 | 2.6~3.3 V | +5.5 V (SMPS) | −5.5 V (SMPS) | Two inductive converters (two inductors) | supply a source current up to 40 mA High power/voltage efficiency Large size and considerable cost |
| Example 5 | 2.6~3.3 V | +5.5 V (SMPS) | −5.5 V (SMPS) | Two inductive converters (one inductor) | supply a source current up to 40 mA High power/voltage efficiency Large size and considerable cost |
| Example 6 | 5.0~5.5 V | +5.5 V (charge pump) | −5.5 V (charge pump) | Two capacitive converters | supply a source current up to 30 mA Practical power/voltage efficiency, Relatively small size High cost |
| Example 7 | — | 5.5 V (external source) | −5.5 V (charge pump) | One external source and One capacitive converter | supply a source current up to 40 mA High power/voltage efficiency, Relatively small size High cost |
| Example 8 | — | 5.5 V (external source) | −5.5 V (external source) | Two external sources | Performance depends on PMIC Excellent power/voltage efficiency, Smallest size High cost |

Referring to Table 1, an inductive converter supplies a relatively high source current compared with a capacitive converter, and an external source supplies a relatively high source current compared with the inductive converter. Although the inductive converter has a large size, and the external source has a high cost, the inductive converter and the external source may stably supply a relatively high source current to the display panel. Thus, the type of a converter may be determined according to the amount of a required source current. In Table 1, example 5 is substantially similar to example 4 except that one inductor is shared by two inductive DC-DC converters in example 5. In example 6, a relatively high input voltage VCI is supplied to the display panel. The capacitive converters of example 6 may be implemented with a small number of capacitors, and thus may have a small size. However, the power converting circuit of example 6 has a relatively high cost. In examples 7 and 8, an external power supply source is used, and thus the power converting circuits of examples 7 and 8 have high power/voltage efficiency. However, the power converting circuits of examples 7 and 8 have a high cost. Hereinafter, power converting circuits according to exemplary embodiments will be described below with reference to FIGS. 4 through 13.

Figure 4:
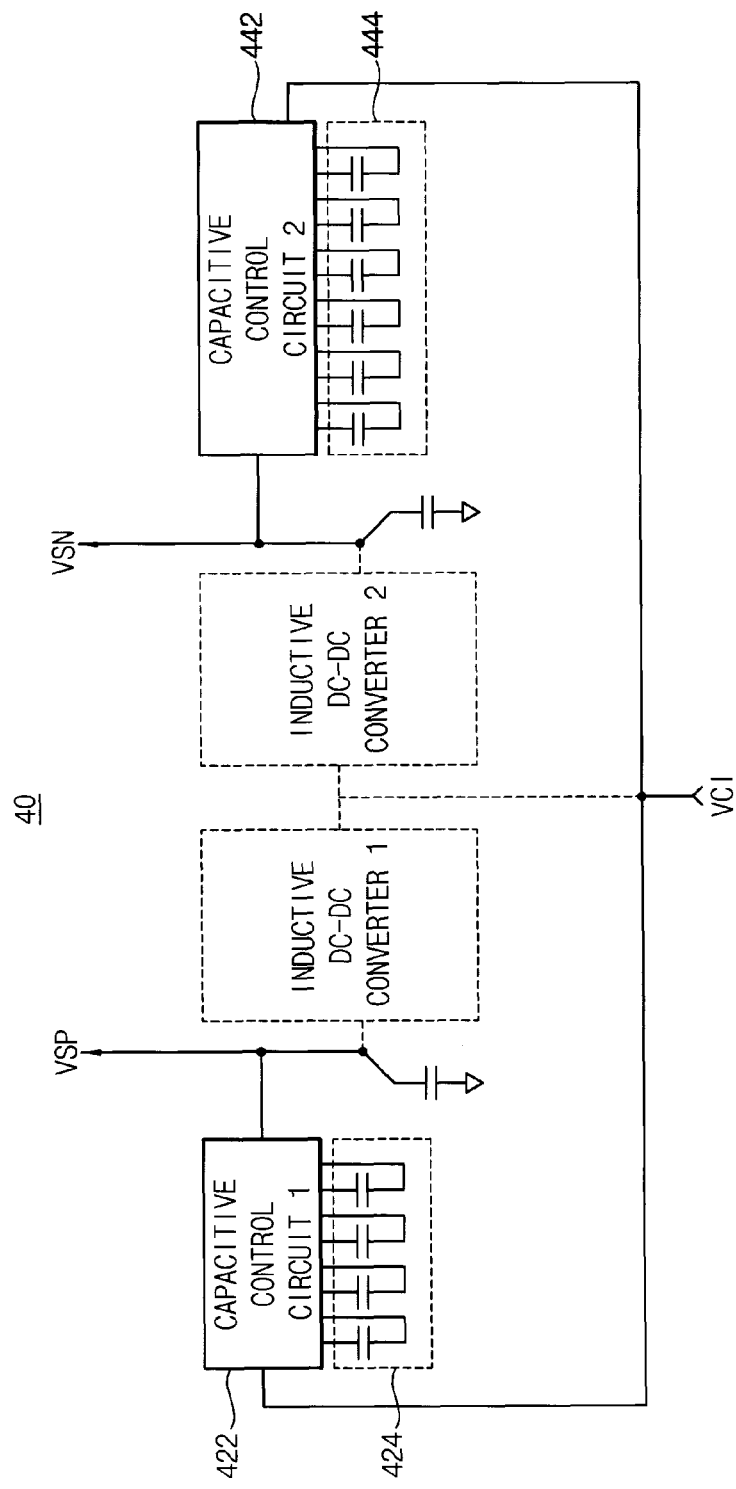
FIG. 4 is a circuit diagram illustrating an example of a power converting circuit of a display driver according to an exemplary embodiment.

FIG. 4 is a circuit diagram illustrating an example of a power converting circuit of a display driver according to an exemplary embodiment. FIG. 4 illustrates the power converting circuit of example 1 in Table 1.

Referring to FIG. 4, a power converting circuit 40 includes two capacitive converters. For example, the power converting circuit 40 has a first capacitive converter including a first capacitive control circuit 422 and a first capacitive converting circuit 424, and a second capacitive converter including a second capacitive control circuit 442 and a second capacitive converting circuit 444. Since the power converting circuit 40 includes capacitors but not an inductor, the power converting circuit 40 has a relatively small size and a relatively low cost. The power converting circuit 40 supplies a source current lower than a first predetermined value. For example, the first predetermined value is about 10 mA.

Figure 5:
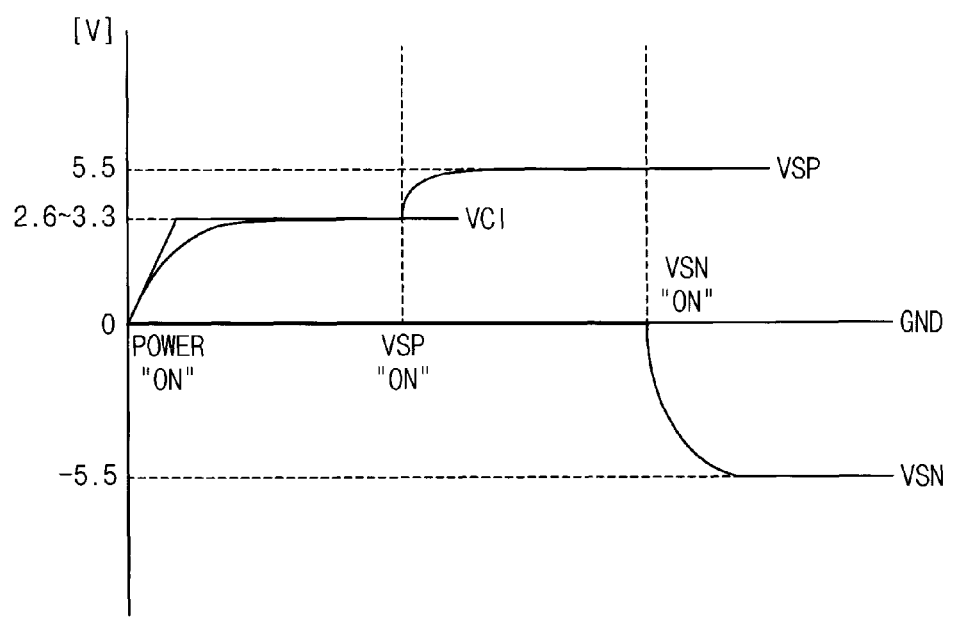
FIG. 5 is a timing diagram for describing an operation of the power converting circuit of FIG. 4.

FIG. 5 is a timing diagram for describing an operation of a power converting circuit of FIG. 4.

Referring to FIGS. 4 and 5, when a display device is powered on at a power-on time POWER "ON", an input voltage VCI from about 2.6 V to about 3.3 V is supplied to the power converting circuit 40. A positive source voltage VSP increases to the input voltage VCI. The first capacitive control circuit 422 starts to perform a boosting operation as a charge pump at a first time point VSP "ON". For example, the first capacitive control circuit 422 drives the first capacitive converting circuit 424 to step up the input voltage VCI. As a result, the positive source voltage VSP is stepped up to about 5.5 V. The second capacitive control circuit 442 maintains a negative source voltage VSN at a ground voltage GND of 0 V until a second time point VSN "ON" and starts to perform a boosting operation as a charge pump at the second time point VSN "ON". For example, the second capacitive control circuit 442 drives the second capacitive converting circuit 444 to step down the input voltage VCI. As a result, the negative source voltage VSN is stepped down to about −5.5 V. The second capacitive converting circuit 444 operates a predetermined time interval after the first capacitive converting circuit 424 operates, and thus a latch-up event is prevented from occurring. Since the negative source voltage VSN is maintained at the ground voltage GND until the second time point VSN "ON", the latch-up event may be further prevented. In an exemplary embodiment, the predetermined time interval is a few milliseconds.

Figure 6:
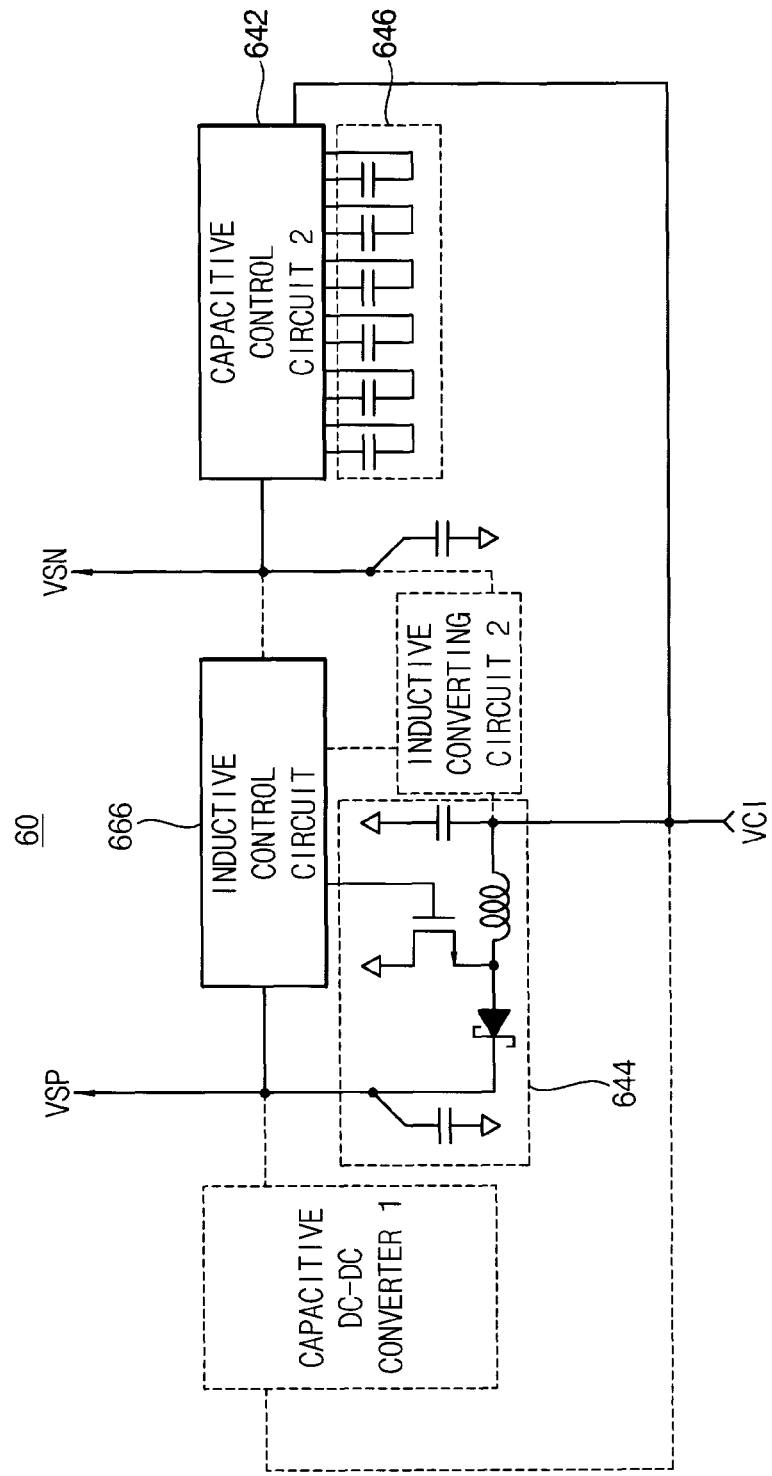
FIG. 6 is a circuit diagram illustrating an exemplary of a power converting circuit of a display driver according to an exemplary embodiment.

FIG. 6 is a circuit diagram illustrating an example of a power converting circuit of a display driver according to an exemplary embodiment. FIG. 6 illustrates the power converting circuit of example 2 in Table 1.

Referring to FIG. 6, a power converting circuit 60 includes one inductive converter and one capacitive converter. For example, the power converting circuit 60 has an inductive converter including an inductive control circuit 666 and an inductive converting circuit 444, and a capacitive converter including a capacitive control circuit 642 and a capacitive converting circuit 646. According to an embodiment, the inductive converter includes a boost converter and generates a positive source voltage VSP by stepping up an input voltage VCI. The inductive control circuit 666 controls an operation of the inductive converting circuit 444. In an exemplary embodiment, the inductive converter including the inductive control circuit 666 and the inductive converting circuit 444 is implemented as a switched mode power supply (SMPS). According to an embodiment, the capacitive converter includes a charge pump and generates a negative source voltage VSN by stepping down the input voltage VCI. The power converting circuit 60 supplies a display panel with a source current higher than a first predetermined value and lower than a second predetermined value. For example, the first predetermined value is about 10 mA, and the second predetermined value is about 20 mA. The power converting circuit 60 of FIG. 6 supplies a source current up to about 20 mA to a display panel and has a power/voltage efficiency higher than a power/voltage efficiency of a power converting circuit 40 as illustrated in FIG. 4.

Figure 7:
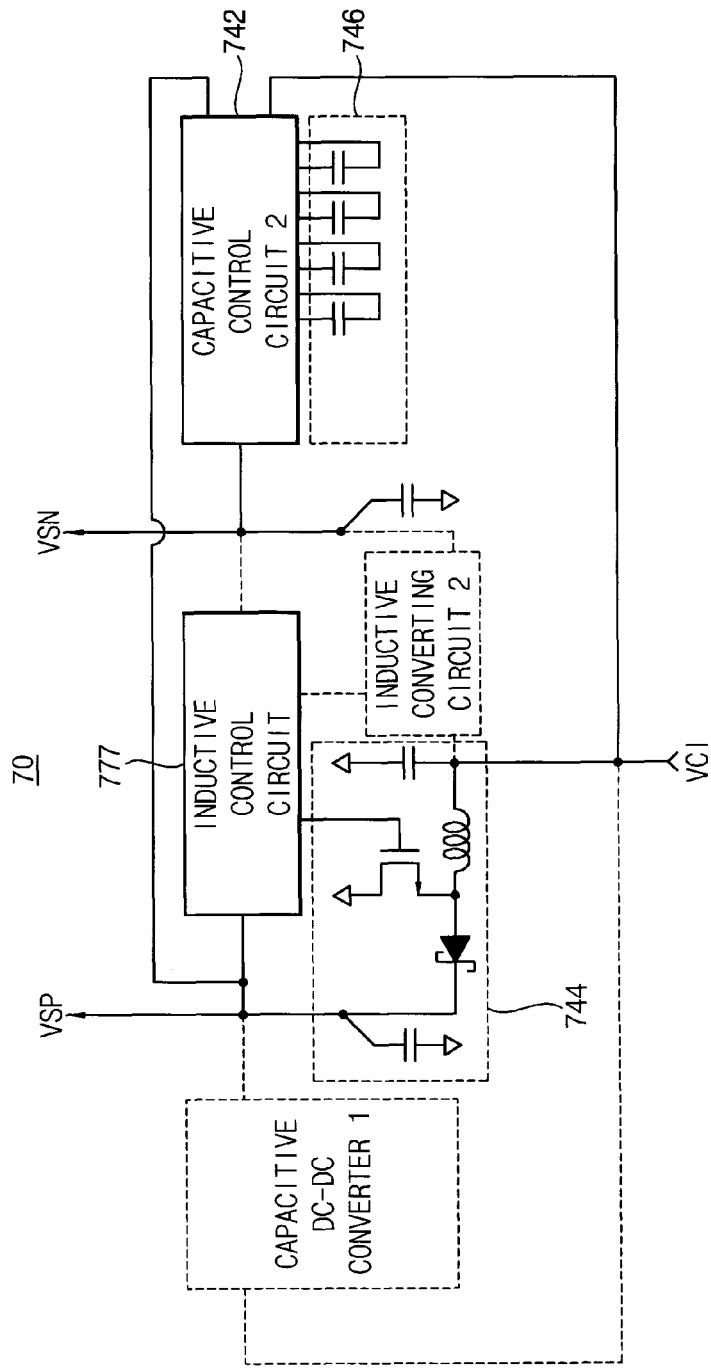
FIG. 7 is a circuit diagram illustrating an exemplary of a power converting circuit of a display driver according to an exemplary embodiment.

FIG. 7 is a circuit diagram illustrating an example of a power converting circuit of a display driver according to an exemplary embodiment. FIG. 7 illustrates the power converting circuit of example 3 in Table 1.

Referring to FIG. 7, a power converting circuit 70 includes one inductive converter and one capacitive converter. For example, the power converting circuit 70 has an inductive converter including an inductive control circuit 777 and an inductive converting circuit 744, and a capacitive converter including a capacitive control circuit 742 and a capacitive converting circuit 746. According to an embodiment, the inductive converter includes a boost converter and generates a positive source voltage VSP by stepping up an input voltage VCI. The inductive control circuit 777 controls an operation of the inductive converting circuit 744. In an exemplary embodiment, the inductive converter including the inductive control circuit 777 and the inductive converting circuit 744 are implemented as an SMPS. According to an embodiment, the capacitive converter includes a charge pump and generates a negative source voltage VSN. Unlike the capacitive converter illustrated in FIG. 6, the capacitive converter illustrated in FIG. 7 is coupled to a node where the positive source voltage VSP is output and uses the positive source voltage VSP to generate the negative source voltage VSN. Accordingly, the number (or size) of capacitors included in the capacitive converting circuit 746 illustrated in FIG. 7 is smaller than the number (or size) of capacitors included in the capacitive converting circuit 646 illustrated in FIG. 6.

The power converting circuit 70 supplies a display panel with a source current higher than a second predetermined value and lower than a third predetermined value. For example, the second predetermined value is about 20 mA, and the third predetermined value is about 30 mA. The power converting circuit 70 of FIG. 7 supplies a source current up to about 30 mA to a display panel and has a power/voltage efficiency higher than a power/voltage efficiency of a power converting circuit 40 as illustrated in FIG. 4.

Figure 8:
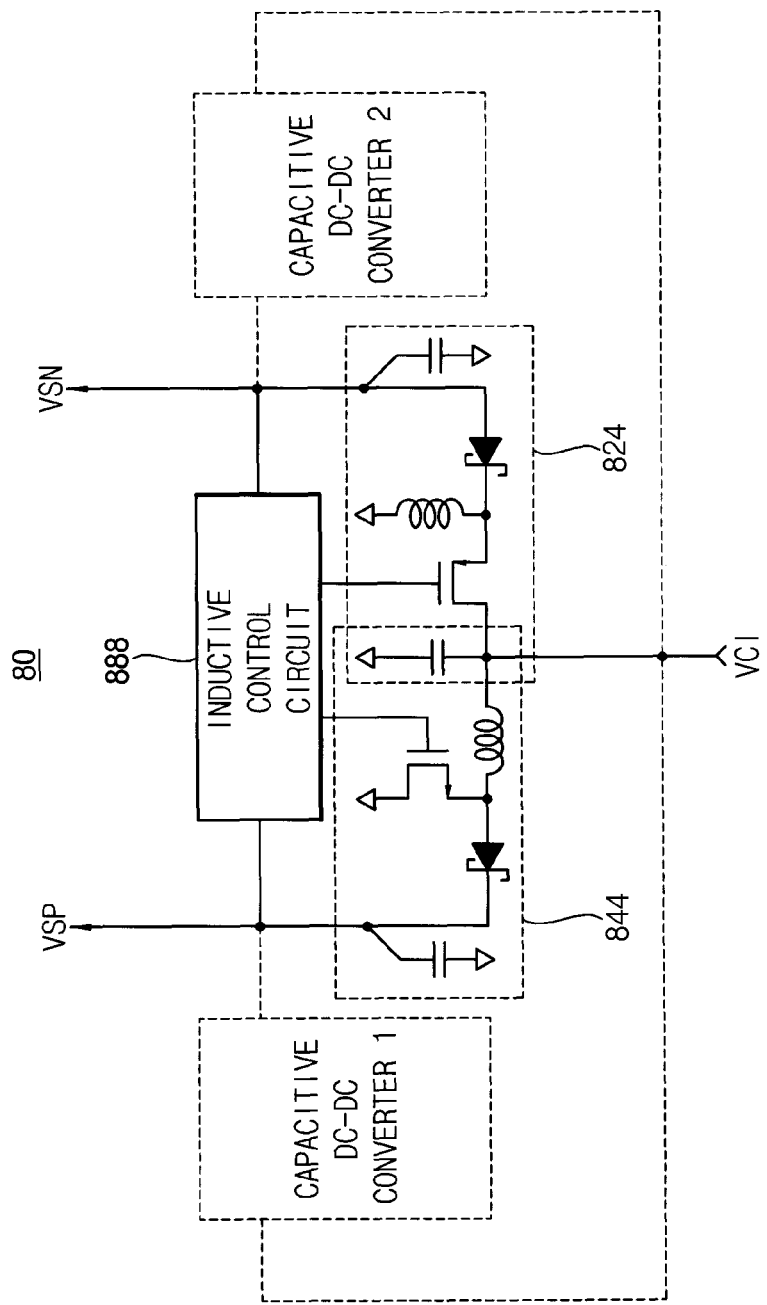
FIG. 8 is a circuit diagram illustrating an example of a power converting circuit of a display driver according to an exemplary embodiment.

FIG. 8 is a circuit diagram illustrating an example of a power converting circuit of a display driver according to an exemplary embodiment. FIG. 8 illustrates the power converting circuit of example 4 in Table 1.

Referring to FIG. 8, a power converting circuit 80 includes two inductive converters. For example, the power converting circuit 80 includes an inductive control circuit 888, a first inductive converting circuit 844 and a second inductive converting circuit 824. Each of the first and second inductive converting circuits 844 and 824 includes one inductor. The inductive control circuit 888 is shared by the first and second inductive converting circuits 844 and 824. One inductive control circuit 888 controls both of the first and second inductive converting circuits 844 and 824. The power converting circuit 80 supplies a display panel with a source current higher than a third predetermined value and lower than a fourth predetermined value. For example, the third predetermined value is about 30 mA, and the fourth predetermined value is about 40 mA. The power converting circuit 80 of FIG. 8 supplies a source current up to about 40 mA to a display panel and has high power/voltage efficiency.

Figure 9:
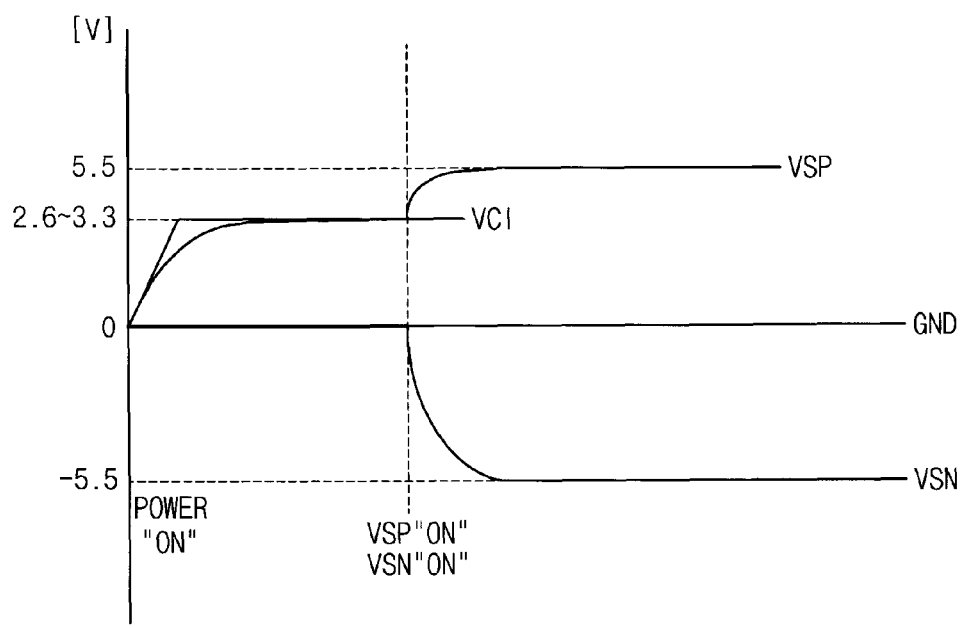
FIG. 9 is a timing diagram for describing an operation of the power converting circuit of FIG. 8.

FIG. 9 is a timing diagram for describing an operation of the power converting circuit of FIG. 8.

Referring to FIGS. 8 and 9, when a display device is powered on at a power-on time POWER "ON", an input voltage VCI from about 2.6 V to about 3.3 V is supplied to the power converting circuit 80. A positive source voltage VSP increases to the input voltage VCI. The inductive control circuit 888 drives the first inductive converting circuit 844 to step up the input voltage VCI at a first time point VSP "ON". As a result, the positive source voltage VSP is stepped up to about 5.5 V. The inductive control circuit 888 maintains a negative source voltage VSN at a ground voltage GND of 0 V until a second time point VSN "ON" and drives the second inductive converting circuit 824 to step down the input voltage VCI at the second time point VSN "ON". As a result, the negative source voltage VSN is stepped down to about −5.5 V. In an exemplary embodiment, the power converting circuit 80 is implemented as an SMPS. In an exemplary embodiment, the first time point VSP "ON" when the first inductive converting circuit 844 operates is the same or substantially the same as the second time point VSN "ON" when the second inductive converting circuit 824 starts to operate. In an exemplary embodiment, the first time point VSP "ON" when the first inductive converting circuit 844 operates is different from the second time point VSN "ON" when the second inductive converting circuit 824 starts to operate. When the first and second inductive converting circuits 844 and 824 start to operate at different time points, a latch-up event may be prevented from occurring. When the negative source voltage VSN is maintained at the ground voltage GND until the second time point VSN "ON", the latch-up event may be further prevented. In an exemplary embodiment, a time interval between the first time point VSP "ON" and the second time point VSN "ON" is a few milliseconds.

Figure 10:
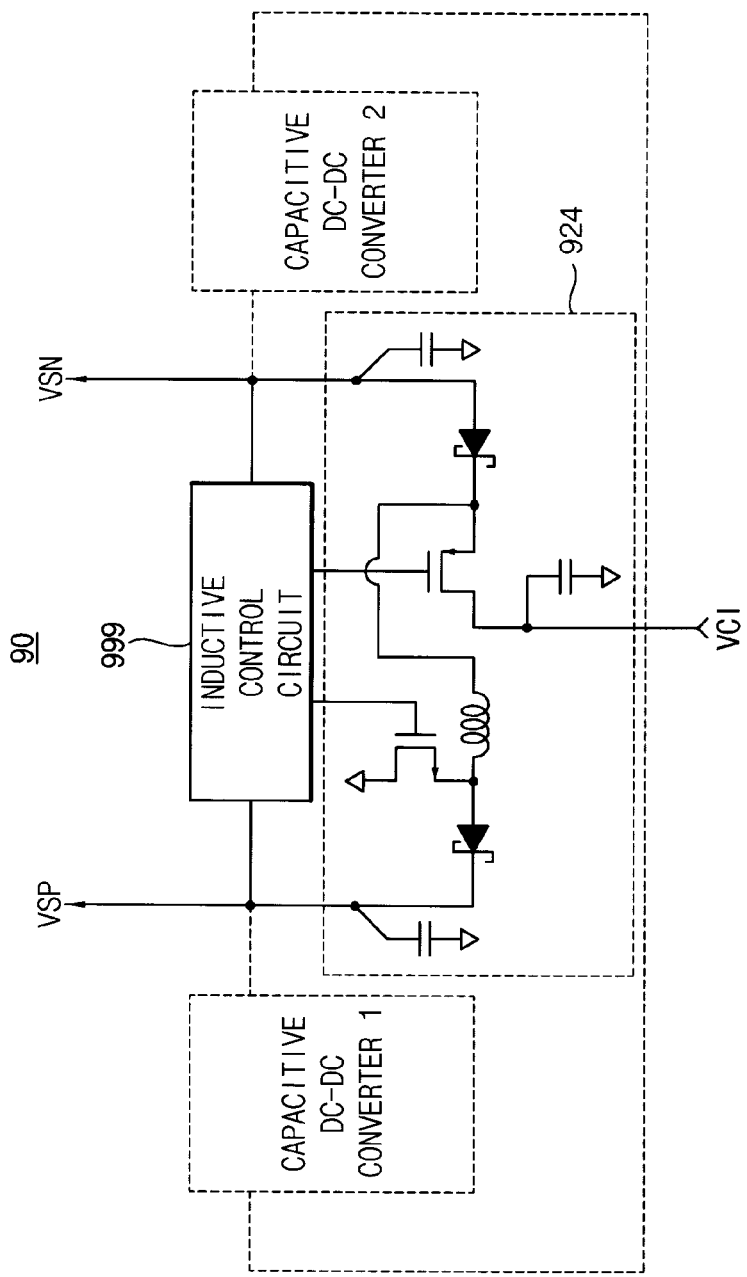
FIG. 10 is a circuit diagram illustrating an example of a power converting circuit of a display driver according to an exemplary embodiment.

FIG. 10 is a circuit diagram illustrating an example of a power converting circuit of a display driver according to an exemplary embodiment. FIG. 10 illustrates the power converting circuit of example 5 in Table 1.

Referring to FIG. 10, a power converting circuit 90 includes two inductive converters. For example, the power converting circuit 90 includes an inductive control circuit 999 and an inductive converting unit 924. In the power converting circuit 90 of FIG. 10, unlike a power converting circuit 80 as illustrated in FIG. 8, one inductor is shared by two inductive converting circuits included in the inductive converting unit 924. Accordingly, the power converting circuit 90 of FIG. 10 has a size smaller than a size of the power converting circuit 80 of FIG. 8. According to an embodiment, the two inductive converting circuits included in the inductive converting unit 924 include a boost converter that generates a positive source voltage VSP by stepping up an input voltage VCI and a buck-boost converter that generates a negative source voltage VSN by stepping down the input voltage VCI. The inductive control circuit 999 controls an operation of the inductive converting unit 924. In an exemplary embodiment, the inductive control circuit 999 and the inductive converting unit 924 are implemented as an SMPS. The power converting circuit 90 supplies a display panel with a source current higher than a third predetermined value and lower than a fourth predetermined value. For example, the third predetermined value is about 30 mA, and the fourth predetermined value is about 40 mA. The power converting circuit 90 of FIG. 10 supplies a source current up to about 40 mA to a display panel and has high power/voltage efficiency.

Figure 11:
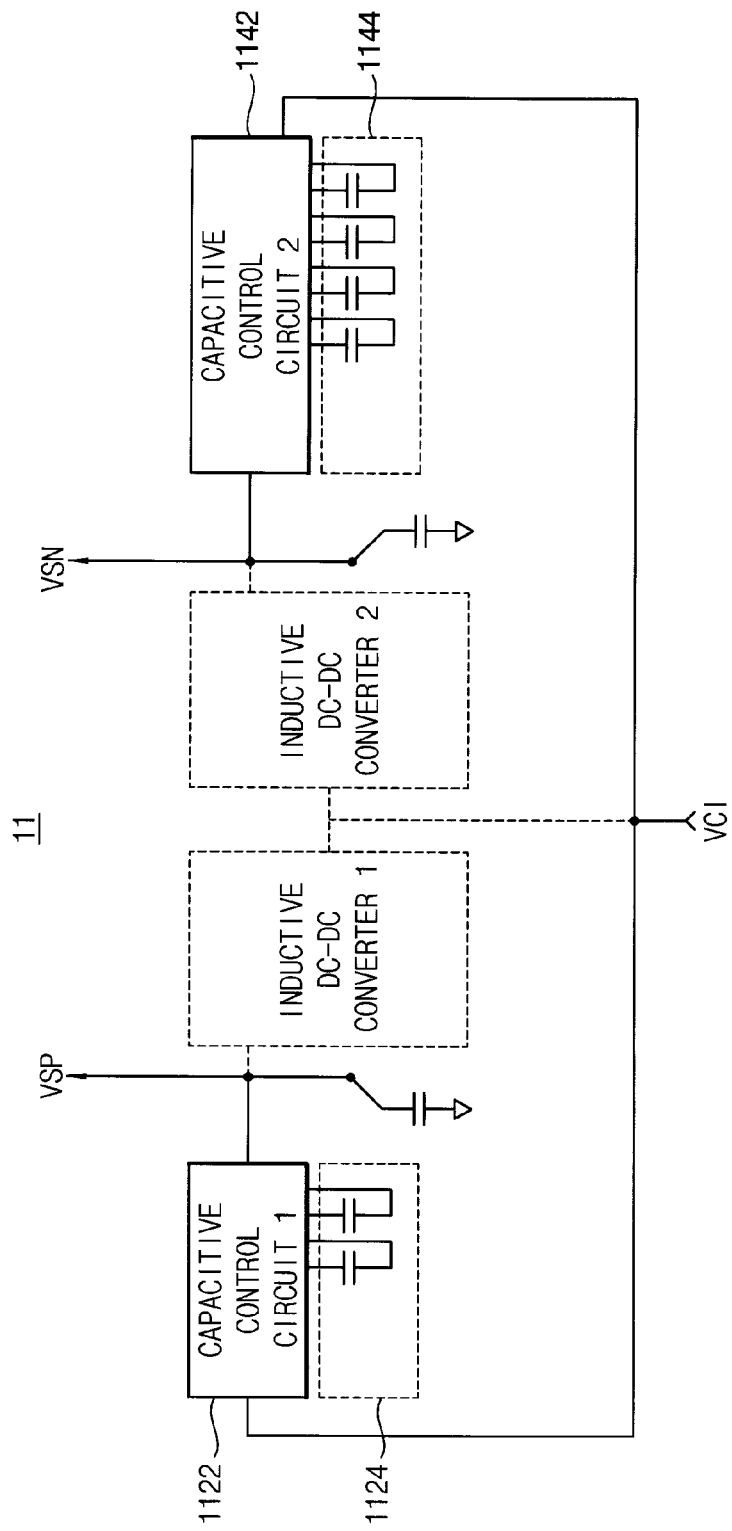
FIG. 11 is a circuit diagram illustrating an example of a power converting circuit of a display driver according to an exemplary embodiment.

FIG. 11 is a circuit diagram illustrating an example of a power converting circuit of a display driver according to an exemplary embodiment. FIG. 11 illustrates the power converting circuit of example 6 in Table 1.

Referring to FIG. 11, a power converting circuit 11 includes two capacitive converters. For example, the power converting circuit 11 has a first capacitive converter including a first capacitive control circuit 1122 and a first capacitive converting circuit 1124, and a second capacitive converter including a second capacitive control circuit 1142 and a second capacitive converting circuit 1144. Each of the first and second capacitive converters operates as a charge pump. The power converting circuit 11 of FIG. 11 has a substantially similar configuration to the power converting circuit 40 of FIG. 4 except that an input voltage VCI supplied to the power converting circuit 11 of FIG. 11 is higher than an input voltage VCI supplied to the power converting circuit 40 of FIG. 4. The input voltage VCI supplied to the power converting circuit 11 of FIG. 11 is from about 5.0 V to about 5.5 V. Thus, the power converting circuit 11 of FIG. 11 generates a positive source voltage VSP and a negative source voltage VSN by using a smaller number of capacitors than the power converting circuit 40 of FIG. 4. Accordingly, the power converting circuit 11 of FIG. 11 has a relatively small size and relatively high power/voltage efficiency. However, since the power converting circuit 11 of FIG. 11 receives a relatively high input voltage VCI, the power converting circuit 11 of FIG. 11 may have a high cost. The power converting circuit 11 supplies a display panel to a source current lower than a third predetermined value. For example, the third predetermined value is about 30 mA. The power converting circuit 11 supplies a source current up to about 30 mA to a display panel.

Figure 12:
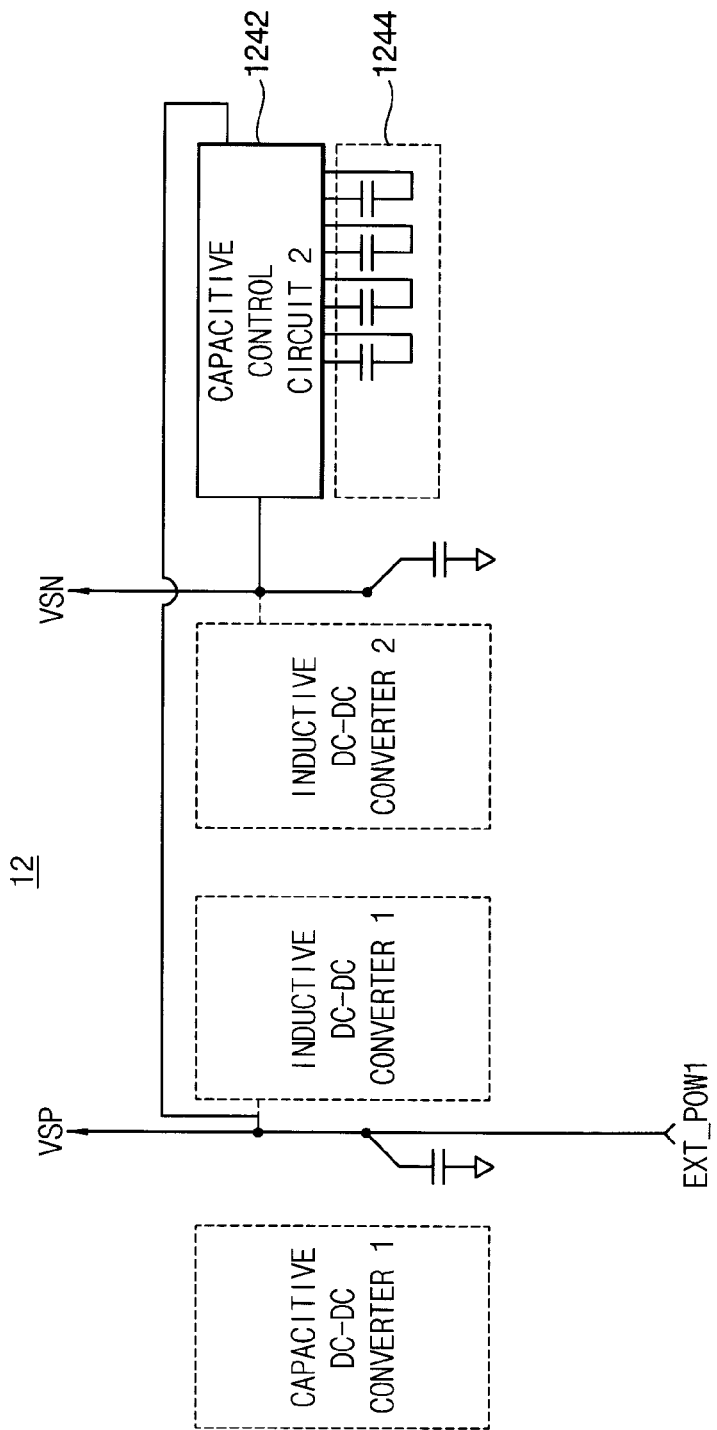
FIG. 12 is a circuit diagram illustrating an example of a power converting circuit of a display driver according to an exemplary embodiment.

FIG. 12 is a circuit diagram illustrating an example of a power converting circuit of a display driver according to an exemplary embodiment. FIG. 12 illustrates the power converting circuit of example 7 in Table 1.

Referring to FIG. 12, a power converting circuit 12 generates a positive source voltage VSP using an external power supply voltage EXT_POW1 and generates a negative source voltage VSN using one capacitive converter. For example, the power converting circuit 12 has a capacitive converter including a capacitive control circuit 1242 and a capacitive converting circuit 1244. The capacitive converter operates as a charge pump. For example, the power converting circuit 12 receives an external power supply voltage EXT_POW1 of about 5.5 V and uses the external power supply voltage EXT_POW1 as the positive source voltage VSP. In an exemplary embodiment, to stabilize the external power supply voltage EXT_POW1, the power converting circuit 12 includes a capacitor at a node where the external power supply voltage EXT_POW1 is supplied. The capacitive converter is coupled to the positive source voltage VSP (e.g., the external power supply voltage EXT_POW1) and generates the negative source voltage VSN by stepping down the positive source voltage VSP. Accordingly, the negative source voltage VSN is generated without receiving an additional input voltage, and a relatively small number of capacitors are used to generate the negative source voltage VSN. The power converting circuit 12 supplies a display panel with a source current higher than a third predetermined value and lower than a fourth predetermined value. For example, the third predetermined value is about 30 mA, and the fourth predetermined value is about 40 mA. The power converting circuit 12 of FIG. 12 supplies a source current up to about 40 mA to a display panel and has a relatively small size and relatively high power/voltage efficiency. However, since the external power supply voltage EXT_POW1 is supplied, a high cost may be consumed.

Figure 13:
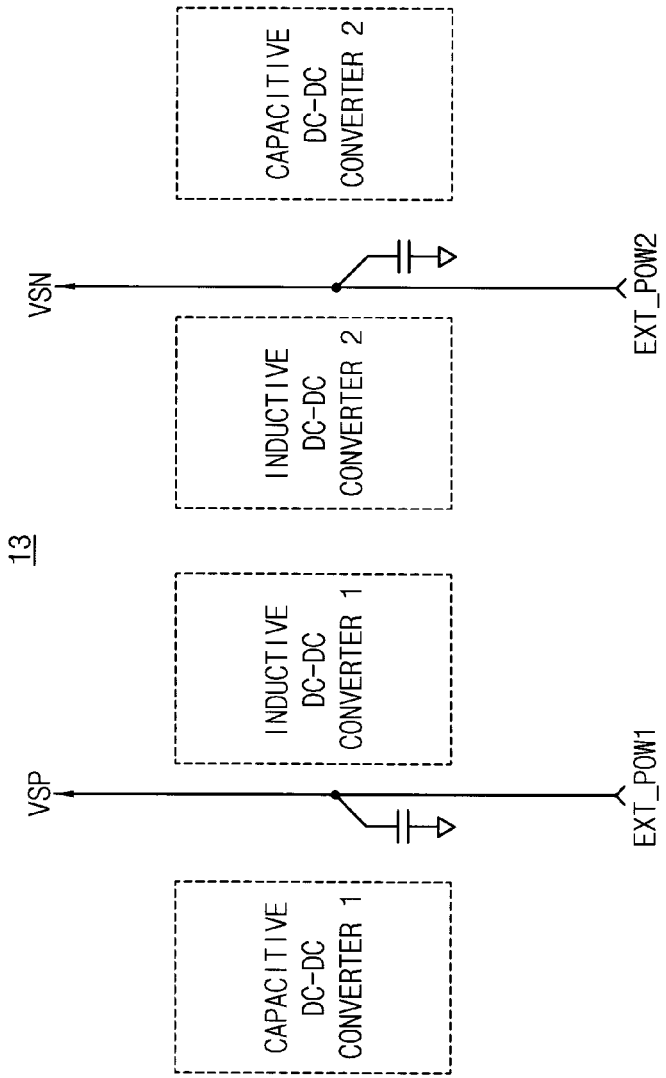
FIG. 13 is a circuit diagram illustrating an example of a power converting circuit of a display driver according to an exemplary embodiment.

FIG. 13 is a circuit diagram illustrating an example of a power converting circuit of a display driver according to an exemplary embodiment. FIG. 13 illustrates the power converting circuit of example 8 in Table 1.

Referring to FIG. 13, a power converting circuit 13 generates a positive source voltage VSP using a first external power supply voltage EXT_POW1 and generates a negative source voltage VSN using a second external power supply voltage EXT_POW2. For example, the power converting circuit 13 receives the first external power supply voltage EXT_POW1 of about 5.5 V and uses the first external power supply voltage EXT_POW1 as the positive source voltage VSP. The power converting circuit 13 receives the second external power supply voltage EXT_POW2 of about −5.5 V and uses the second external power supply voltage EXT_POW2 as the negative source voltage VSN. In an exemplary embodiment, to stabilize the first and second external power supply voltages EXT_POW1 and EXT_POW2, the power converting circuit 13 includes capacitors at nodes where the first and second external power supply voltages EXT_POW1 and EXT_POW2 are supplied. In an exemplary embodiment, a power management integrated circuit (PMIC) included in a main board provides the power converting circuit 13 with the first and second external power supply voltages EXT_POW1 and EXT_POW2, and thus the power converting circuit 13 supplies various amounts of source currents to a display panel. Since the external power supply voltages EXT_POW1 and EXT_POW2 are directly supplied as the source voltages VSP and VSN, the power converting circuit 13 has a relatively small size and relatively high power/voltage efficiency. However, a high cost may be consumed.

Figure 14:
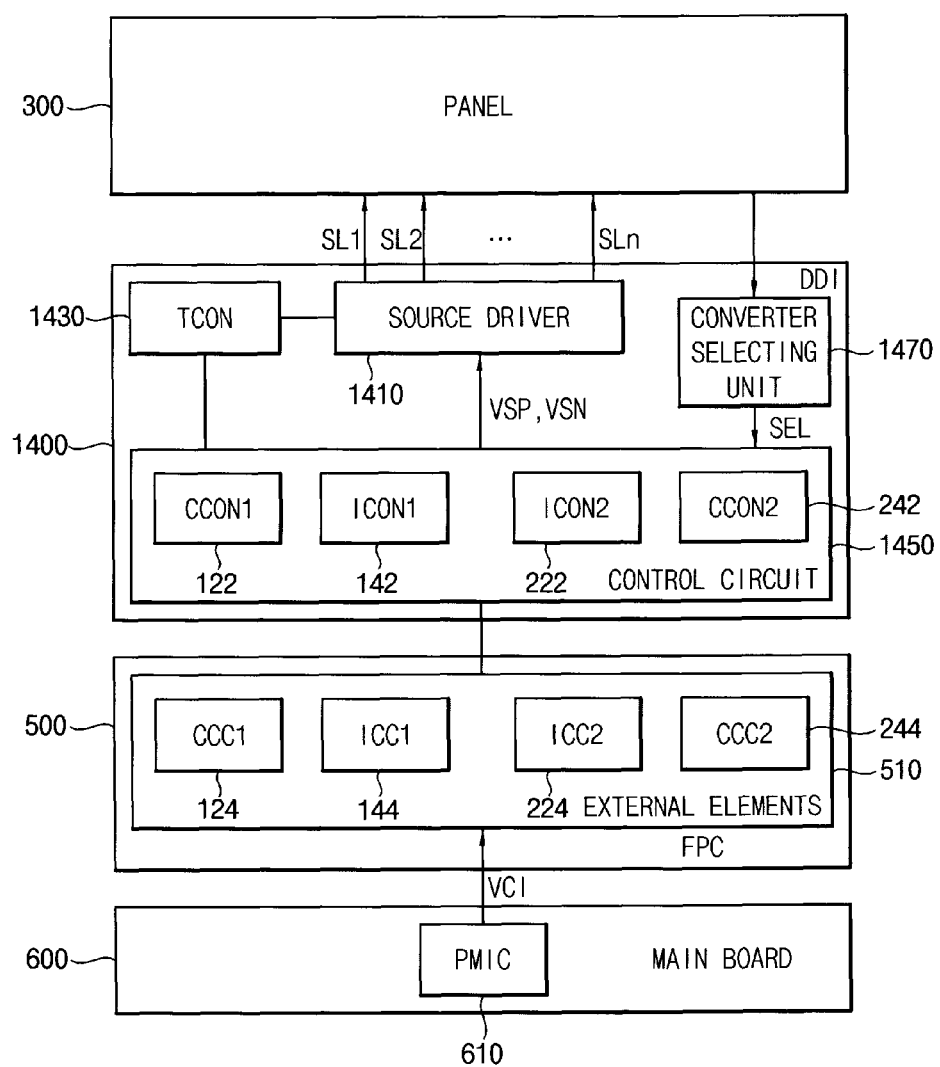
FIG. 14 is a block diagram of a display device for describing a location of a power converting circuit of a display driver according to an exemplary embodiment.

FIG. 14 is a block diagram for describing a location of a power converting circuit of a display driver according to an exemplary embodiment.

As shown in FIG. 14, an example of an arrangement of components included in a display device (e.g., a mobile display device) is illustrated. Referring to FIG. 14, a DDI (Display Driver Integrated Circuit) 1400 includes a source driver 1410, a timing controller 1430, a control circuit 1450 and a converter selecting unit 1470. The source driver 1410 provides source current SL1, SL2 and SLn to a display panel 300. The timing controller 1430 controls operation timings of the source driver 1410 and the control circuit 1450.

The control circuit 1450 includes a first capacitive control circuit 122, a first inductive control circuit 142, a second inductive control circuit 222 and a second capacitive control circuit 242 that are located in the DDI 1400. External elements 510 include a first capacitive converting circuit 124, a first inductive converting circuit 144, a second inductive converting circuit 224 and a second capacitive converting circuit 244 that are located in an FPC (Flexible Printed Circuit) 500. The control circuit 1450 is disposed in the DDI 1400, and the external elements 510 are disposed in the FPC 500. As a result, since the control circuit 1450 and the external elements 510 are disposed in the DDI 1400 and the FPC 500, respectively, a power converting circuit including the control circuit 1450 and the external elements 510 have high voltage conversion efficiency. Since the external elements 510 are disposed outside the DDI 1400, space efficiency may be increased. A source current is stably supplied to a display panel 300, and productivity and compatibility of the DDI 1400 may be increased.

The converter selecting unit 1470 generates a selection signal SEL by detecting the source currents SL1, SL2 and SLn provided from the source driver 1410 to the display panel 300. In an exemplary embodiment, when the resolution, the brightness, or the operation mode of the display panel 300 is changed, the amounts of the source currents SL1, SL2 and SLn are changed, and the converter selecting unit 1470 detects the change in the source currents SL1, SL2 and SLn. When the converter selecting unit 1470 detects the change in the source currents SL1, SL2 and SLn, the converter selecting unit 1470 generates the selection signal SEL to select a type of a converter corresponding to the change in the source currents SL1, SL2 and SLn.

The control circuit 1450 switches the converters in response to the selection signal SEL such that a converter to supply the display panel 300 with the source currents SL1, SL2 and SLn currently required by the display panel 300 may be used. For example, when the source currents SL1, SL2 and SLn increase from about 10 mA to about 40 mA, for example, due to an increase in the resolution of the display panel 300, the converter selecting unit 1470 detects the increased source currents SL1, SL2 and SLn and generates the selection signal SEL corresponding to the increased source currents SL1, SL2 and SLn. In response to the selection signal SEL, the control circuit 1450 turns off the first and second capacitive converting circuits 124 and 244 and turns on the first and second inductive converting circuits 144 and 224. According to an embodiment, an inductive converter supplies a relatively high source current compared with a capacitive converter, and an external source supplies a relatively high source current compared with the inductive converter. The type of a converter corresponding to the amount of the source current is determined according to a selection guideline as illustrated in Table 1.

Hereinafter, operations of a display device including the converter selecting unit 1470 will be described below with reference to FIGS. 15, 16A and 16B.

Figure 15:
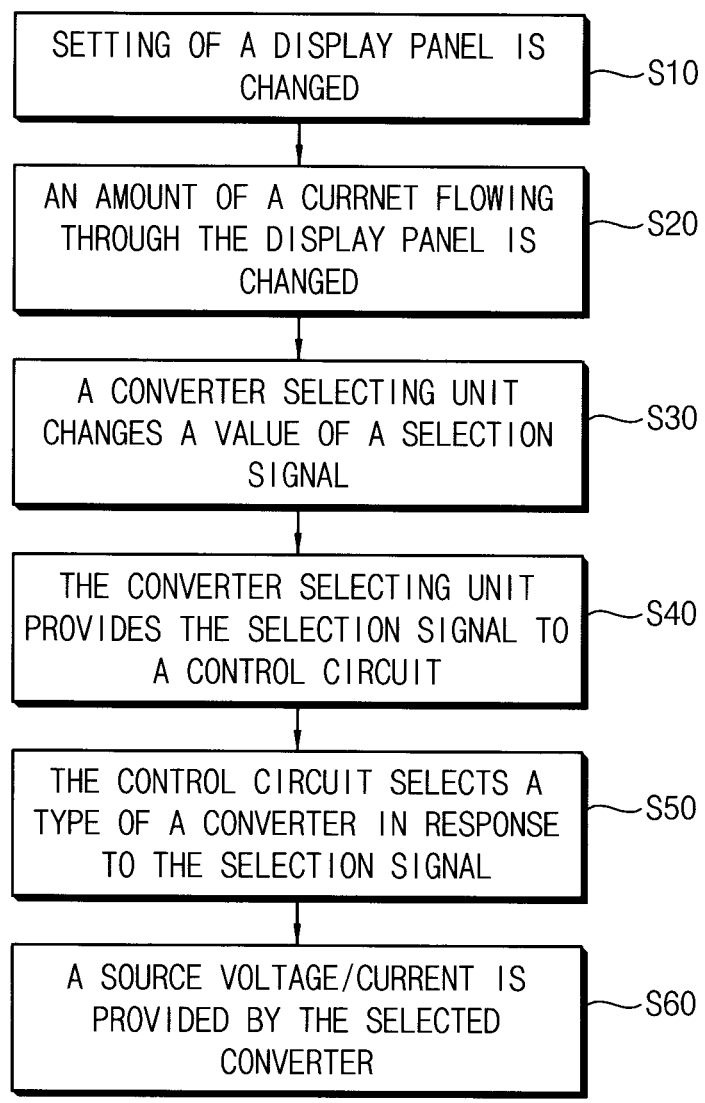
FIG. 15 is a flow chart illustrating an operation of a display device including a power converting circuit according to an exemplary embodiment.

FIG. 15 is a flow chart illustrating an operation of a display device including a power converting circuit of FIG. 14. FIGS. 16A and 16B are diagrams for describing an exemplary operation of a display device including a power converting circuit as illustrated in FIG. 14.

Figure 16A:
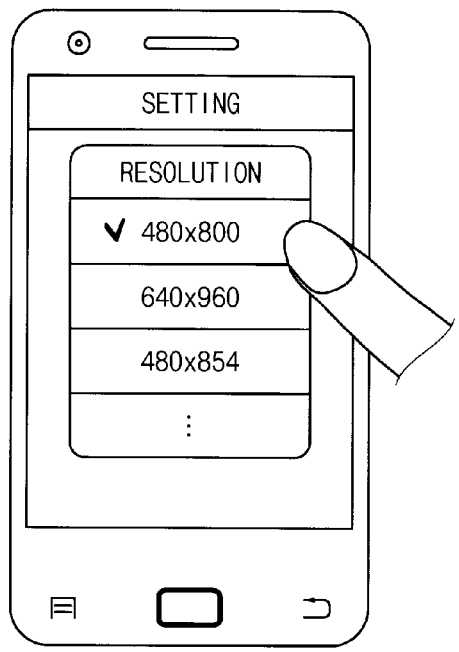
FIGS. 16A and 16B are diagrams for describing an exemplary operation of a display device including a power converting circuit according to an exemplary embodiment.
Figure 16B:
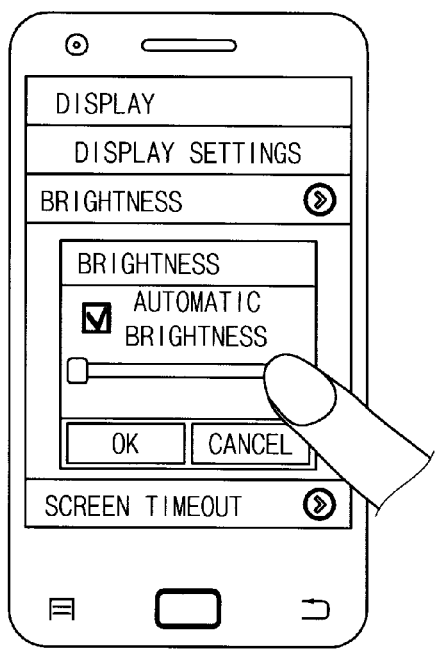

Referring to FIGS. 15, 16A and 16B, settings of a display device may be changed while the display device operates (S10). For example, as illustrated in FIG. 16A, a resolution of a display panel may be changed automatically or manually by a user. As another example, as illustrated in FIG. 16B, a brightness of the display panel may be changed automatically or manually by a user. When the settings are changed, the amount of a source current flowing through the display panel (or an amount of a required source current) may be changed (S20). As still another example, when a mode of the display device changes from a sleep mode (or a standby mode) to an active mode, the amount of the source current flowing through the display panel may be changed.

When the amount of the source current flowing through the display panel is changed, a converter selecting unit may change a value of a selection signal based on the changed amount of the source current (S30). The converter selecting unit provides the selection signal to a control circuit (S40). The control circuit selects a type of a converter in response to the selection signal (S50). According to an embodiment, an inductive converter supplies a relatively high source current compared with a capacitive converter, and an external source supplies a relatively high source current compared with the inductive converter. The type of a converter corresponding to the amount of the source current is determined according to a selection guideline as illustrated in Table 1.

When the type of the converter is selected, a source voltage and the source current are supplied using the selected converter or an external power supply voltage (S60). For example, the power converting circuit generates a positive source voltage and a negative source voltage by using the selected converter or the external power supply voltage and provides the positive source voltage and the negative source voltage to a source driver. The source driver generates the source current and provides the generated source current to the display panel.

Figure 17:
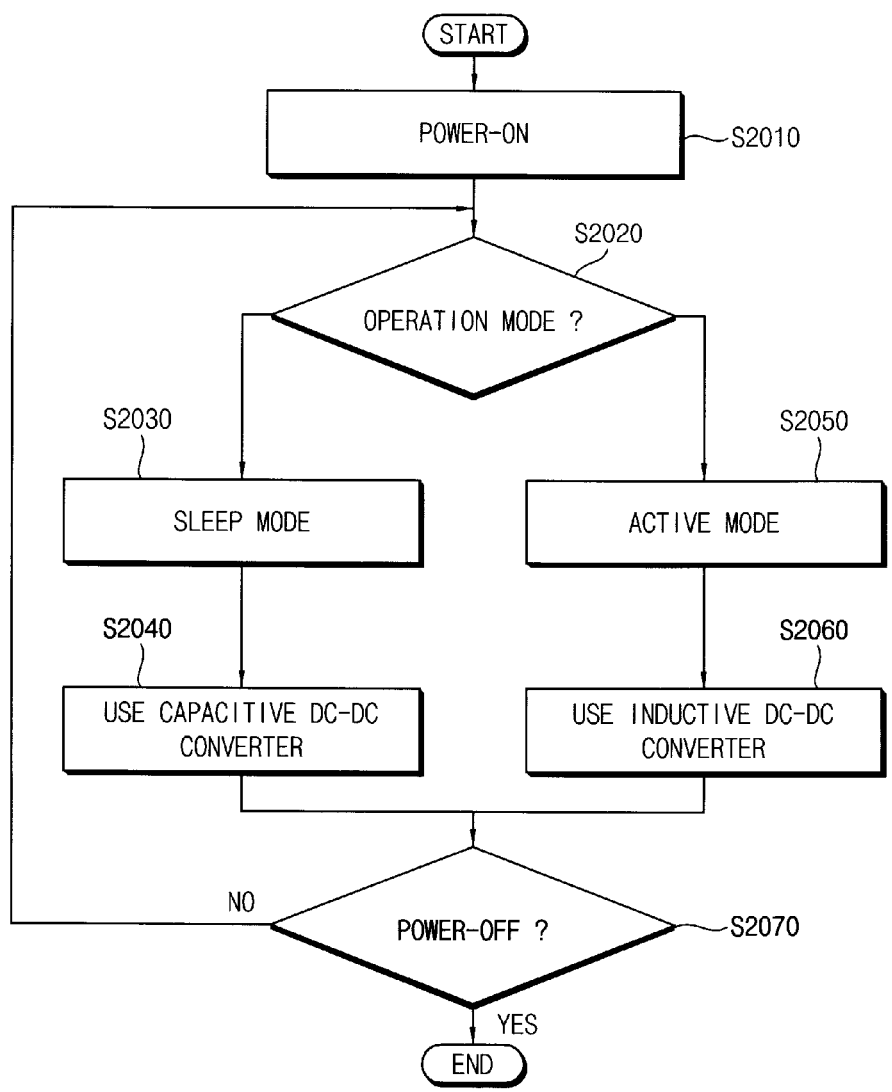
FIG. 17 is a flow chart illustrating a method of operating a display device including a power converting circuit according to an exemplary embodiment.

FIG. 17 is a flow chart illustrating a method of operating a display device including a power converting circuit according to an exemplary embodiment.

Referring to FIG. 17, after a mobile system including a display device, such as a mobile phone, a smart phone, a laptop computer, or a tablet computer, is powered on (S2010), a power converting circuit of the display device selects a type of a converter according to an operation mode of the display device (S2020).

When the display device operates in a sleep mode (or a standby mode) (S2030), the power converting circuit of the display device uses a capacitive DC-DC converter to generate positive and negative source voltages (S2040). Alternatively, when the display device operates in an active mode (S2050), the power converting circuit of the display device uses an inductive DC-DC converter to generate the positive and negative source voltages (S2060).

While the mobile system is running (S2070: NO), the operation mode of the display device may be changed manually by a user or automatically by the mobile system. For example, if the user presses a power button of the mobile system while the display device operates in the active mode, the operation mode of the display device changes from the active mode to the sleep mode. According to an embodiment, the power converting circuit of the display device changes the converter for generating the positive and negative source voltages from the inductive DC-DC converter to the capacitive DC-DC converter. As another example, when the mobile system receives no input from the user during a predetermined time period while the display device operates in the active mode, the mobile system changes the operation mode of the display device from the active mode to the sleep mode. According to an embodiment, the power converting circuit of the display device changes the converter for generating the positive and negative source voltages from the inductive DC-DC converter to the capacitive DC-DC converter.

In the method of operating the display device including the power converting circuit according to an exemplary embodiment, the power converting circuit may change the type of the converter for generating the source voltages according to the operation mode of the display device.

Although FIG. 17 illustrates an example where the capacitive DC-DC converter is used in the sleep mode and the inductive DC-DC converter is used in the active mode, according to an exemplary embodiment, various types of converters may be used in the sleep mode and the active mode. For example, according to an embodiment, the capacitive DC-DC converter is used in the sleep mode, and an external power supply voltage is used in the active mode. As another example, the inductive DC-DC converter is used in the sleep mode, and the external power supply voltage is used in the active mode. As still another example, two capacitive DC-DC converters respectively generating the positive source voltage and the negative source voltage are used in the sleep mode, and one capacitive DC-DC converter and one inductive DC-DC converter are used in the active mode.

Figure 18:
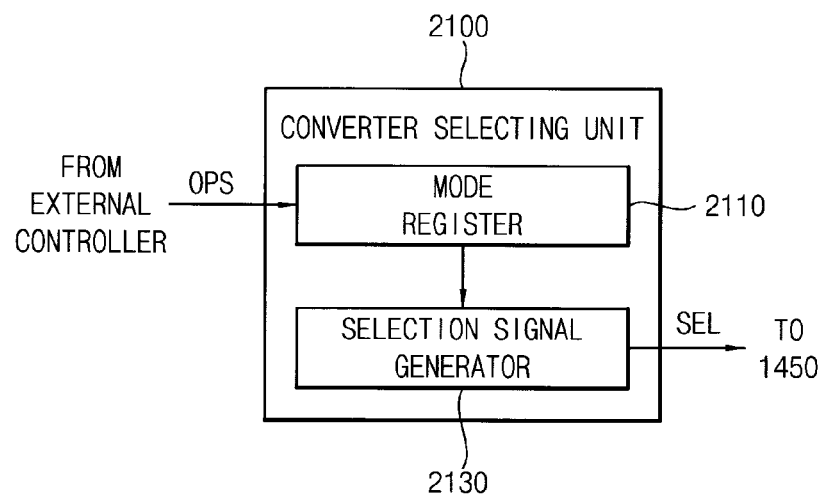
FIG. 18 is a block diagram illustrating an example of a converter selecting unit included in a power converting circuit as illustrated in FIG. 14.

FIG. 18 is a block diagram illustrating an example of a converter selecting unit included in a power converting circuit as illustrated in FIG. 14.

Referring to FIG. 18, a converter selecting unit 2100 includes a mode register 2110 and a selection signal generator 2130.

The mode register 2110 receives an operation mode signal OPS representing an operation mode of a display device from an external controller controlling the display device and stores the received operation mode signal OPS. For example, the external controller includes a graphics controller, a display controller, or an application process. In an exemplary embodiment, the operation mode signal OPS indicates a sleep mode or an active mode.

The selection signal generator 2130 generates a selection signal SEL representing a type of a converter based on the operation mode signal OPS stored in the mode register 2110. For example, the selection signal SEL indicates a capacitive DC-DC converter, an inductive DC-DC converter or an external power supply voltage. According to an exemplary embodiment, the selection signal SEL indicates one type of the converter with respect to both of positive and negative source voltages or indicates one type of the converter with respect to the positive source voltage and one type of the converter with respect to the negative source voltage. The selection signal generator 2130 provides the selection signal SEL to a control circuit 1450 as illustrated in FIG. 14. The control circuit 1450 switches the type of the converter in response to the selection signal SEL.

For example, when the operation mode signal OPS indicates the sleep mode, the selection signal generator 2130 generates the selection signal SEL indicating the capacitive DC-DC converter, and the control circuit 1450 turns on first and second capacitive converting circuits 124 and 244 as illustrated in FIG. 14 in response to the selection signal SEL indicating the capacitive DC-DC converter. When the operation mode signal OPS indicates the active mode, the selection signal generator 2130 generates the selection signal SEL indicating the inductive DC-DC converter, and the control circuit 1450 turns on first and second inductive converting circuits 144 and 224 as illustrated in FIG. 14 in response to the selection signal SEL indicating the inductive DC-DC converter.

The converter selecting unit 2100 selects the type of the converter according to the operation mode of the display device.

Although FIG. 18 illustrates an example of the converter selecting unit 2100 including the mode register 2110 that stores the operation mode signal OPS received from the external controller, in an exemplary embodiment, the converter selecting unit 2100 includes a register that receives information about a brightness or a resolution of the display device from the external controller and stores the received information. According to an embodiment, the selection signal generator 2130 generates the selection signal SEL based on the information about the brightness or the resolution of the display device.

Figure 19:
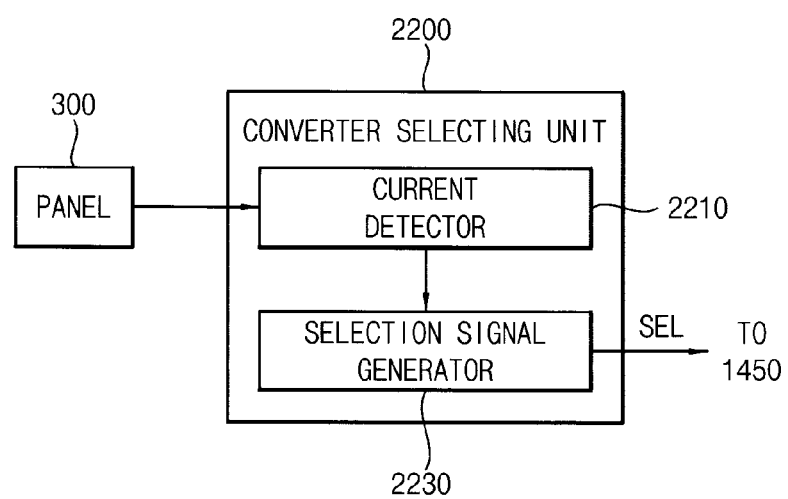
FIG. 19 is a block diagram illustrating another example of a converter selecting unit included in a power converting circuit as illustrated in FIG. 14.

FIG. 19 is a block diagram illustrating an example of a converter selecting unit included in a power converting circuit as illustrated in FIG. 14.

Referring to FIG. 19, a converter selecting unit 2200 includes a current detector 2210 and a selection signal generator 2230.

The current detector 2210 detects the amount of a source current supplied to a display panel 300. For example, the current detector 2210 detects the amount of a current flowing through a power supply line of the display panel 300.

The selection signal generator 2230 generates a selection signal SEL representing a type of a converter based on the amount of the source current detected by the current detector 2210. For example, the selection signal generator 2230 generates the selection signal SEL indicating a capacitive DC-DC converter when the amount of the source current detected by the current detector 2210 is less than a first predetermined value, generates the selection signal SEL indicating an inductive DC-DC converter when the amount of the source current detected by the current detector 2210 is greater than the first predetermined value and less than a second predetermined value, and generates the selection signal SEL indicating an external power supply voltage when the amount of the source current detected by the current detector 2210 is greater than the second predetermined value. The selection signal generator 2230 provides the selection signal SEL to a control circuit 1450 as illustrated in FIG. 14. The control circuit 1450 switches the type of the converter in response to the selection signal SEL.

For example, when an operation mode of the display device is changed from an active mode to a sleep mode, the amount of the source current supplied to the display device may be reduced. The current detector 2210 detects the reduced amount of the source current, and the selection signal generator 2230 generates the selection signal SEL indicating the capacitive DC-DC converter in response to the detected reduction of the amount of the source current. The control circuit 1450 turns on first and second capacitive converting circuits 124 and 244 as illustrated in FIG. 14 in response to the selection signal SEL indicating the capacitive DC-DC converter.

As another example, when a brightness of the display device is set to a lower value manually by a user or automatically due to low battery power, the amount of the source current supplied to the display device may be reduced. As still another example, when a resolution of the display device is set to a lower value manually by a user or automatically due to low battery power, the amount of the source current supplied to the display device may be reduced. The current detector 2210 detects the reduced amount of the source current, the selection signal generator 2230 generates the selection signal SEL in response to the detected reduction of the amount of the source current, and the control circuit 1450 switches the type of the converter in response to the selection signal SEL.

The converter selecting unit 2200 selects the type of the converter by detecting the amount of the source current supplied to the display panel 300 such that the converter that allows the power converting circuit to produce the amount of the source current is used to generate the positive and negative source voltages.

Figure 20:
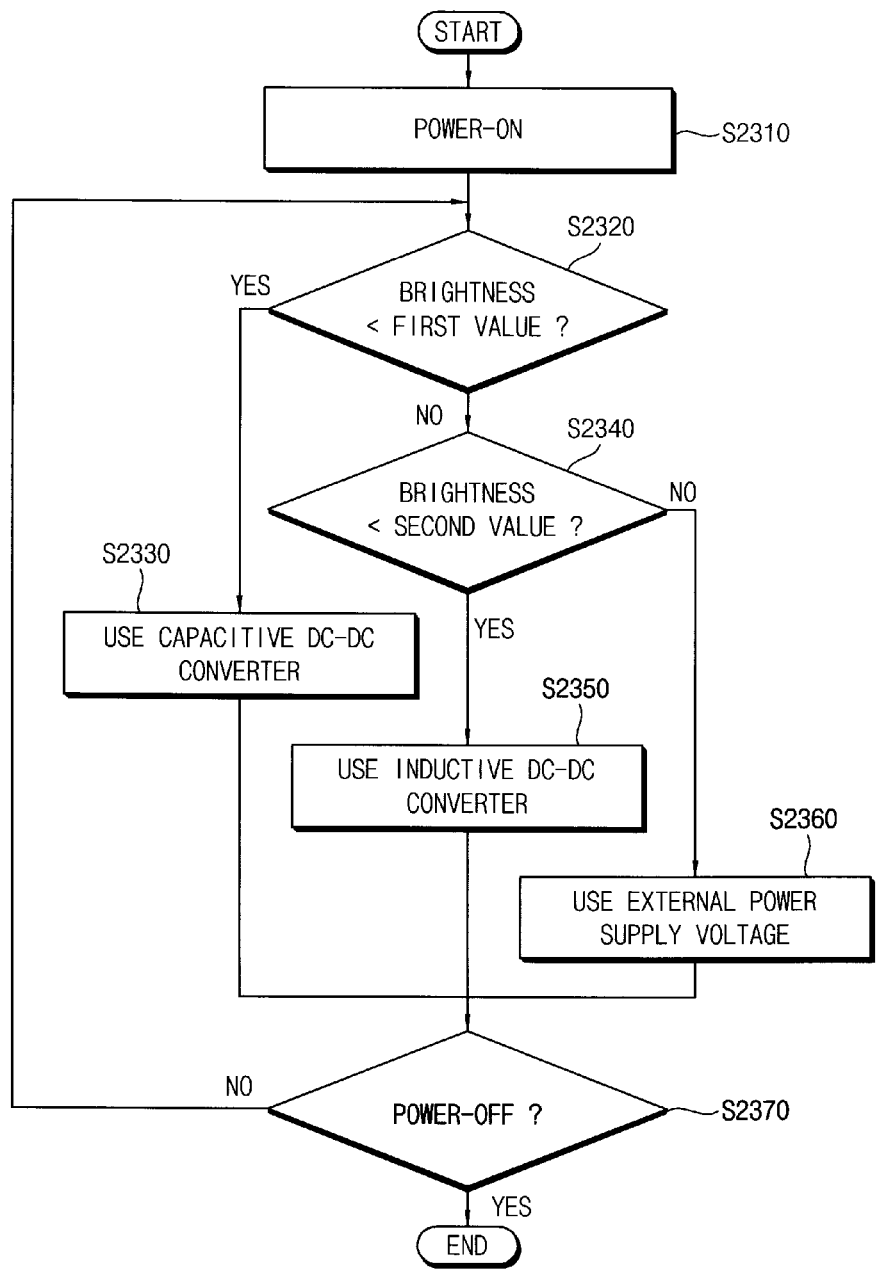
FIG. 20 is a flow chart illustrating a method of operating a display device including a power converting circuit according to an exemplary embodiment.

FIG. 20 is a flow chart illustrating a method of operating a display device including a power converting circuit according to an exemplary embodiment.

Referring to FIG. 20, after a mobile system including a display device is powered on (S2310), a power converting circuit of the display device selects a type of a converter according to a brightness of the display device.

When the brightness of the display device is lower than a first predetermined value (S2320:YES), the power converting circuit of the display device uses a capacitive DC-DC converter to generate positive and negative source voltages (S2330). When the brightness of the display device is higher than or equal to the first predetermined value and lower than a second predetermined value (S2320: NO and S2340: YES), the power converting circuit of the display device uses an inductive DC-DC converter to generate the positive and negative source voltages (S2350). When the brightness of the display device is higher than the second predetermined value (S2340: NO), the power converting circuit of the display device uses an external power supply voltage to generate the positive and negative source voltages (S2360).

While the mobile system is running (S2370: NO), the brightness of the display device may be changed manually by a user or automatically by the mobile system. For example, when the user changes a brightness setting as illustrated in FIG. 16B, the power converting circuit of the display device selects the type of the converter corresponding to the changed brightness. As another example, the mobile system automatically changes the brightness, for example, when the battery is low, and the power converting circuit of the display device selects the type of the converter corresponding to the changed brightness.

In the method of operating the display device including the power converting circuit according to an exemplary embodiment, the power converting circuit changes the type of the converter for generating the source voltages according to the brightness of the display device.

Although FIG. 20 illustrates an example where the brightness of the display device is divided into three ranges by the first and second predetermined values, according to an exemplary embodiment, the brightness of the display device is divided into various numbers of ranges. For example, the brightness of the display device is divided into five ranges by four predetermined values. For example, according to an embodiment, when the brightness is lower than a first predetermined value of the four predetermined values, two capacitive converting circuits are used to generate the positive and negative source voltages. When the brightness is higher than the first predetermined value and lower than a second predetermined value of the four predetermined values, one capacitive converting circuit and one inductive converting circuit are used to generate the positive and negative source voltages. When the brightness is higher than the second predetermined value and lower than a third predetermined value of the four predetermined values, two inductive converting circuits are used to generate the positive and negative source voltages. When the brightness is higher than the third predetermined value and lower than a fourth predetermined value of the four predetermined values, one inductive converting circuit and one external power supply voltage are used to generate the positive and negative source voltages. When the brightness is higher than the fourth predetermined value, two external power supply voltages are used to generate the positive and negative source voltages.

Figure 21:
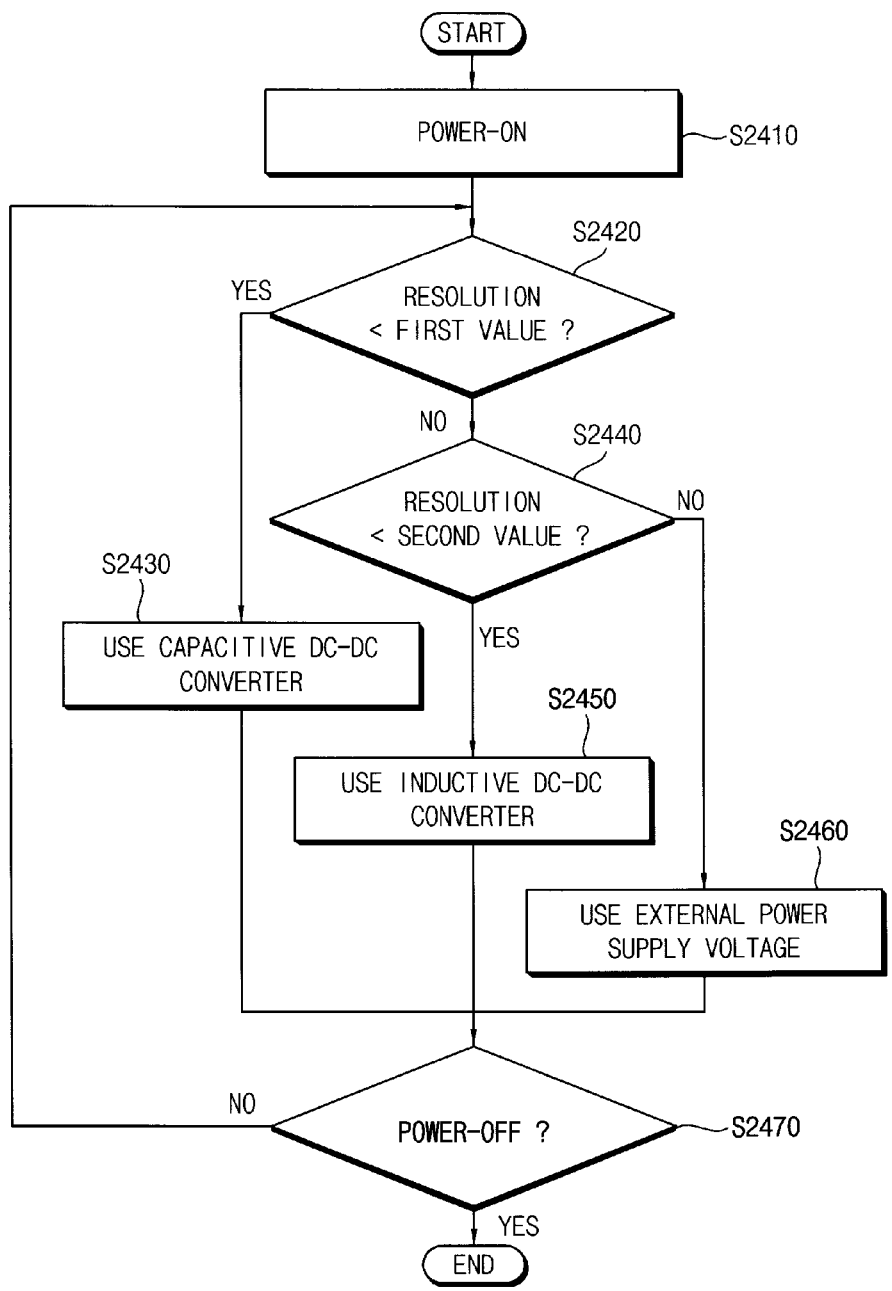
FIG. 21 is a flow chart illustrating a method of operating a display device including a power converting circuit according to an exemplary embodiment.

FIG. 21 is a flow chart illustrating a method of operating a display device including a power converting circuit according to an exemplary embodiment.

Referring to FIG. 21, after a mobile system including a display device is powered on (S2410), a power converting circuit of the display device selects a type of a converter according to a resolution of the display device.

When the resolution of the display device is lower than a first predetermined value (S2420:YES), the power converting circuit of the display device uses a capacitive DC-DC converter to generate positive and negative source voltages (S2430). When the resolution of the display device is higher than or equal to the first predetermined value and lower than a second predetermined value (S2420: NO and S2440: YES), the power converting circuit of the display device uses an inductive DC-DC converter to generate the positive and negative source voltages (S2450). When the resolution of the display device is higher than the second predetermined value (S2440: NO), the power converting circuit of the display device uses an external power supply voltage to generate the positive and negative source voltages (S2460).

While the mobile system is running (S2470: NO), the resolution of the display device may be changed manually by a user or automatically by the mobile system. For example, when the user changes a resolution setting as illustrated in FIG. 16A, the power converting circuit of the display device selects the type of the converter corresponding to the changed resolution. As another example, the mobile system automatically changes the resolution, for example, when an application program is newly executed and displayed, and the power converting circuit of the display device selects the type of the converter corresponding to the changed resolution.

In the method of operating the display device including the power converting circuit according to an exemplary embodiment, the power converting circuit changes the type of the converter for generating the source voltages according to the resolution of the display device.

Although FIG. 21 illustrates an example where the resolution of the display device is divided into three ranges by the first and second predetermined values, according to an exemplary embodiment, the resolution of the display device is divided into various numbers of ranges. Although FIG. 21 illustrates an example where one type of the converter is determined with respect to both of the positive and negative source voltages, in an exemplary embodiment, types of the converters for generating the positive source voltage and the negative source voltage, respectively, are determined.

Figure 22A:
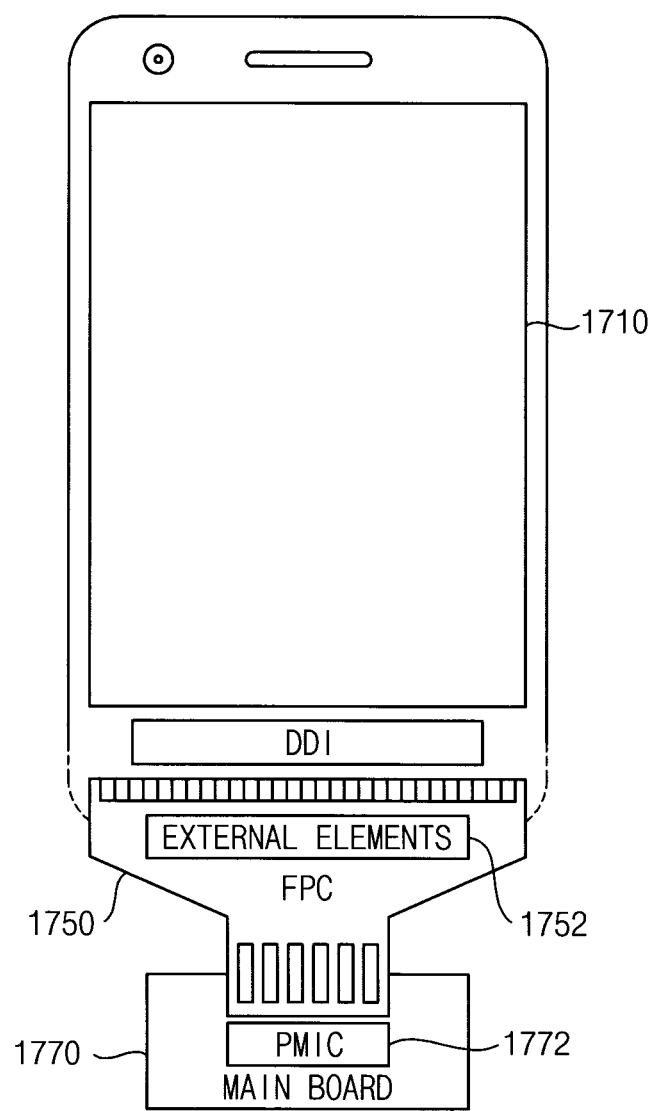
FIG. 22A is a diagram illustrating a mobile display device including a power converting circuit of a display driver according to an exemplary embodiment.
Figure 22B:
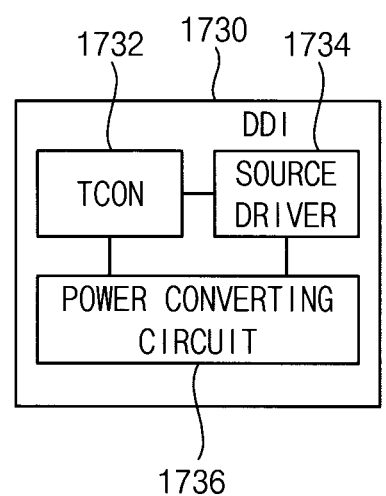
FIG. 22B is a diagram illustrating an example of the display driver integrated circuit (DDI) of FIG. 22A.

FIG. 22A is a diagram illustrating a mobile display device including a power converting circuit of a display driver according to an exemplary embodiment, and FIG. 22B is a diagram illustrating an example of the display driver integrated circuit (DDI) of FIG. 22A.

Referring to FIG. 22, a mobile display device 17 includes a display panel 1710, a DDI 1730, an FPC 1750 and a main board 1770.

The DDI 1730 includes a source driver 1734 that provides a source current to the display panel 1710, a power converting circuit 1736 that provides a source voltage to the source driver 1734, a timing controller 1732 that provides a clock signal to the source driver 1734 and the power converting circuit 1736. In an exemplary embodiment, external elements 1752 are disposed in the FPC 1750 that connects the DDI 1730 with the main board 1770. A PMIC 1772 is disposed on the main board 1770 and provides an input voltage to the external elements 1752.

The power converting circuit 1736 includes passive elements, such as capacitors or inductors, and a control circuit that controls the passive elements. In an exemplary embodiment, the control circuit included in the power converting circuit 1736 is disposed in the DDI 1730, and the passive elements are disposed in the external elements 1752 of the FPC 1750. As a result, voltage conversion efficiency and space efficiency of the power converting circuit 1736 may be improved. The DDI 1730 including the control circuit that is able to control both of a capacitive DC-DC converter and an inductive DC-DC converter is mass-produced, and passive elements may be formed on the FPC 1750 according to a type of a display panel and/or a source current load when the display device 17 including the DDI 1750 is manufactured. As a result, a source current may be stably supplied to the display panel, and productivity and compatibility of the DDI 1750 may be increased.

Figure 23A:
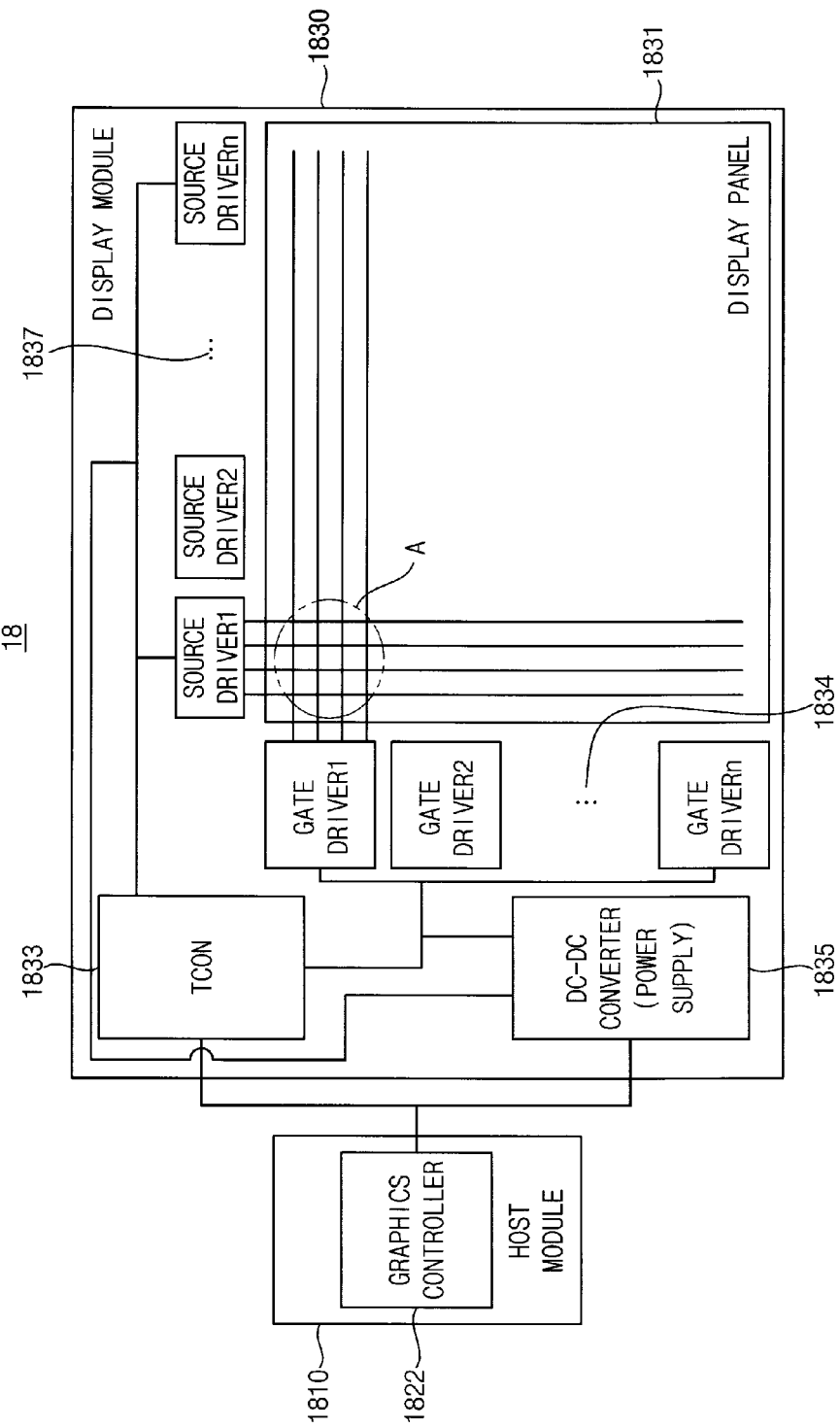
FIG. 23A is a block diagram illustrating a display device including a power converting circuit of a display driver according to an exemplary embodiment.
Figure 23B:
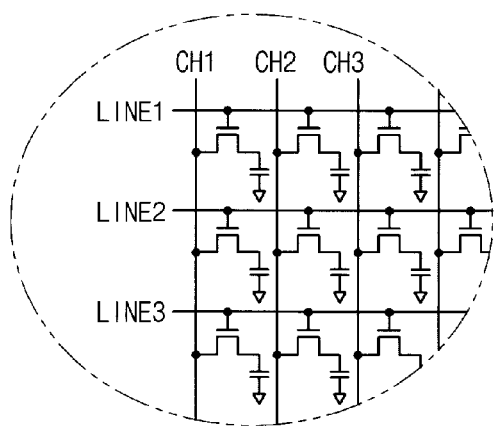
FIG. 23B is an expanded view illustrating area A of FIG. 23A.

FIG. 23A is a block diagram illustrating a display device including a power converting circuit of a display driver according to an exemplary embodiment, and FIG. 23B is an expanded view illustrating area A of FIG. 23A.

Referring to FIG. 23, a display device 18 includes a display module 1830 and a host module 1810 for controlling the display module 1830.

The host module 1810 includes a graphics controller 1822. The host module 1810 transfers signals for controlling components of the display module 1830, such as a timing controller 1833 or a DC-DC converter 1835, to the components. The host module 1810 provides an input voltage to the DC-DC converter 1835.

The display module 1830 includes a display panel 1831, the timing controller 1833, the DC-DC converter 1835, a source driver 1837 and a gate driver 1834. The display panel 1831 includes a plurality of gate lines LINE1, LINE2 and LINE3 extending in a first direction and a plurality of data lines CH1, CH2 and CH3 extending in a second direction. The second direction is perpendicular to the first direction. The display panel 1831 includes a plurality of pixels. The plurality of pixels are coupled to the plurality of gate lines LINE1, LINE2 and LINE3 and the plurality of data lines CH1, CH2 and CH3 and are arranged in a matrix form.

The gate driver 1834 sequentially applies a gate signal to the plurality of gate lines LINE1, LINE2 and LINE3 during each frame. The source driver 1837 applies a data signal corresponding to an image to the plurality of data lines CH1, CH2 and CH3. The plurality of pixels store the data signal in response to the gate signal and display the image based on the stored data signal. In an exemplary embodiment, the data signal is in the form of an electric current, and the source driver 1837 adjusts a value of the data signal by adjusting the amount of the current.

As a resolution and a size of a display panel increase, a current load for the source driver increases. The source driver may supply a relatively high source current to the display panel. The DC-DC converter 1835 including a power converting circuit according to an exemplary embodiment includes a capacitive DC-DC converter, an inductive DC-DC converter and a control circuit for controlling both of the capacitive and inductive DC-DC converters. The DC-DC converter 1835 generates a positive source voltage and a negative source voltage by selectively using the capacitive DC-DC converter, the inductive DC-DC converter or an external power supply voltage.

Figure 24:
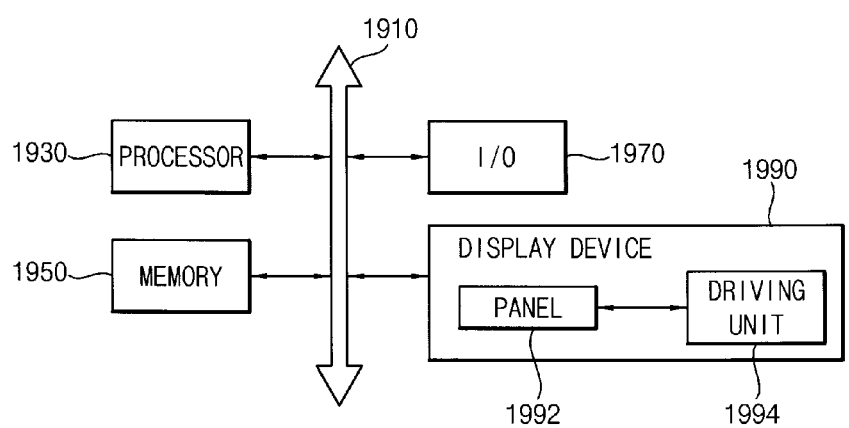
FIG. 24 is a block diagram illustrating a system including a display device according to an exemplary embodiment.

FIG. 24 is a block diagram illustrating a system including a display device according to an exemplary embodiment.

Referring to FIG. 24, a system 19 includes a processor 1930, a memory device 1950, an input/output device 1970 and a display device 1990.

The processor 1930 performs predetermined calculations or tasks. For example, the processor 1930 includes a microprocessor, a central processing unit (CPU), or a digital signal processor. The processor 1930 is coupled to the memory device 1950 via a bus 1910, such as an address bus, a control bus and/or a data bus. For example, the memory device 1950 is implemented as a dynamic random access memory (DRAM), a mobile DRAM, a static random access memory (SRAM), a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM). The processor 1930 is coupled to an extension bus, such as a peripheral component interconnect (PCI) bus, and controls the input/output device 1970. The input/output device 1970 includes at least one input device, such as a keyboard, a mouse, or a touch screen, and at least one output device, a printer, or a display device.

The display device 1990 is coupled to the processor 1930, for example, via the bus 1910. The display device 1990 includes a display panel 1992 including a plurality of pixels coupled to a plurality of gate lines and a plurality of source lines, and a driving unit 1994 for driving the display panel 1992. The driving unit 1994 includes a timing controller, a source driver, a gate driver and a power converting circuit.

The display device 1990 is implemented as a mobile display device 17 of FIG. 22 or a display device 18 of FIG. 23. The display device 1990 includes the power converting circuit that selects a type of a converter according to the amount of a source current. Since the display device 1990 includes the power converting circuit that selects the type of the converter according to the amount of the source current, the source current may be stably supplied to the display panel 1992, and productivity and compatibility of the display driver may be increased.

According to an exemplary embodiment, the system 19 includes an electronic device, such as a mobile phone, a smart phone, a digital television, a personal digital assistant (PDA), a music player, a laptop computer, a desktop computer, a tablet computer, or a digital computer.

The foregoing is illustrative of the exemplary embodiments and is not to be construed as limiting thereof. Although a few exemplary embodiments have been described, those skilled in the art will readily appreciate that many modifications are possible in the exemplary embodiments. Accordingly, all such modifications are intended to be included within the scope of the embodiments of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A power converting circuit of a display driver, comprising:
   a positive voltage generator including a first capacitive DC-DC (Direct Current-Direct Current) converter and a first inductive DC-DC converter, the positive voltage generator configured to generate a positive source voltage by selectively using one of the first capacitive DC-DC converter, the first inductive DC-DC converter, or a first external power supply voltage; and
   a negative voltage generator including a second capacitive DC-DC converter and a second inductive DC-DC converter, the negative voltage generator configured to generate a negative source voltage by selectively using one of the second capacitive DC-DC converter, the second inductive DC-DC converter, or a second external power supply voltages;
   wherein the positive voltage generator is configured to use the first capacitive DC-DC converter, the first inductive DC-DC converter, and the first external power supply voltage in an order of the first capacitive DC-DC converter, the first inductive DC-DC converter, and the first external power supply voltage as an amount of a source current supplied from a source driver to a display panel increases, and
   wherein the negative voltage generator is configured to use the second capacitive DC-DC converter, the second inductive DC-DC converter, and the second external power supply voltage in an order of the second capacitive DC-DC converter, the second inductive DC-DC converter, and the second external power supply voltage as the amount of the source current increases.

2. The power converting circuit of claim 1, wherein the positive and negative voltage generators are configured to generate the positive and negative source voltages by using the first and second capacitive DC-DC converters when the amount of the source current is lower than a first predetermined value,
   wherein the positive and negative voltage generators are configured to generate the positive and negative source voltages by using one of the first or second capacitive DC-DC converter and one of the first or second inductive DC-DC converter when the amount of the source current is higher than or equal to the first predetermined value and is lower than a second predetermined value,
   wherein the positive and negative voltage generators are configured to generate the positive and negative source voltages by using the first and second inductive DC-DC converters when the amount of the source current is higher than or equal to the second predetermined value and is lower than a third predetermined value,
   wherein the positive and negative voltage generators are configured to generate the positive and negative source voltages by using one of the first or second inductive DC-DC converter and one of the first or second external power supply voltage when the amount of the source current is higher than or equal to the third predetermined value and is lower than a fourth predetermined value, and
   wherein the positive and negative voltage generators are configured to generate the positive and negative source voltages by using the first and second external power supply voltages when the amount of the source current is higher than the fourth predetermined value.

3. The power converting circuit of claim 1, wherein the first capacitive DC-DC converter comprises a first capacitive control circuit and a first capacitive converting circuit including at least one capacitor,
   wherein the first inductive DC-DC converter comprises a first inductive control circuit, and a first inductive converting circuit including at least one inductor,
   wherein the second capacitive DC-DC converter comprises a second capacitive control circuit and a second capacitive converting circuit including at least one capacitor, and
   wherein the second inductive DC-DC converter comprises a second inductive control circuit and a second inductive converting circuit including at least one inductor.

4. The power converting circuit of claim 3, wherein the first capacitive control circuit, the first inductive control circuit, the second capacitive control circuit and the second inductive control circuit are located in the display driver, and
   wherein the first capacitive converting circuit, the first inductive converting circuit, the second capacitive converting circuit, and the second inductive converting circuit are located in a flexible printed circuit (FPC) that connects the display driver with a main board.

5. The power converting circuit of claim 3, wherein at least one of the first capacitive converting circuit or the second capacitive converting circuit includes a charge pump,
   wherein the first inductive converting circuit includes a boost converter, and
   wherein the second inductive converting circuit includes a buck-boost converter.

6. The power converting circuit of claim 3, wherein the first inductive control circuit and the second inductive control circuit are implemented as one inductive control circuit that is configured to control both of the first and second inductive converting circuits.

7. The power converting circuit of claim 3, wherein the first and second inductive converting circuits share one inductor.

* * * * *